United States Patent
Woodley

(10) Patent No.: US 10,442,254 B2
(45) Date of Patent: Oct. 15, 2019

(54) CONTROLLER FOR A MOTOR VEHICLE AND METHOD

(71) Applicant: JAGUAR LAND ROVER LIMITED, Whitley, Coventry, Warwickshire (GB)

(72) Inventor: Jonathan Woodley, Warwick (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 4 days.

(21) Appl. No.: 15/735,507

(22) PCT Filed: Jun. 10, 2016

(86) PCT No.: PCT/EP2016/063281
§ 371 (c)(1),
(2) Date: Dec. 11, 2017

(87) PCT Pub. No.: WO2016/198592
PCT Pub. Date: Dec. 15, 2016

(65) Prior Publication Data
US 2018/0178598 A1 Jun. 28, 2018

(30) Foreign Application Priority Data
Jun. 12, 2015 (GB) .................................. 1510340.1

(51) Int. Cl.
*B60C 23/00* (2006.01)
*B60C 23/04* (2006.01)
*B60C 23/02* (2006.01)
*G07C 5/00* (2006.01)

(52) U.S. Cl.
CPC ............ *B60C 23/003* (2013.01); *B60C 23/02* (2013.01); *B60C 23/04* (2013.01); *G07C 5/006* (2013.01)

(58) Field of Classification Search
CPC ....... B60C 23/003; B60C 23/02; B60C 23/04; G07C 5/006
USPC ............................................ 701/36; 152/415
See application file for complete search history.

(56) References Cited

U.S. PATENT DOCUMENTS

| 5,540,268 A * | 7/1996 | Mittal ................... B60C 23/003 152/415 |
| 2013/0276902 A1 | 10/2013 | Medley et al. |
| 2015/0096655 A1 | 4/2015 | Koulinitch et al. |
| 2015/0101702 A1* | 4/2015 | Dean ..................... B60C 23/003 141/4 |

FOREIGN PATENT DOCUMENTS

| EP | 0587306 A1 | 3/1994 |
| GB | 2256836A A | 12/1992 |

OTHER PUBLICATIONS

British Search Report for application No. GB1510340.1, dated Dec. 8, 2016, 4 pages.
International Search Report for International application No. PCT/EP2016/063281, dated Sep. 16, 2016, 5 pages.
Written Opinion for International application No. PCT/EP2016/063281, dated Sep. 16, 2016, 5 pages.

* cited by examiner

*Primary Examiner* — Isaac G Smith
(74) *Attorney, Agent, or Firm* — Reising Ethington P.C.

(57) ABSTRACT

A controller for a motor vehicle central tire inflation system. The controller causes the system to operate in a selected one of a plurality of operating modes that include a leakage assist mode in which the controller causes the system to inflate the tires to predetermined leakage assist pressure value. The controller is configured automatically to cause the system to assume the leakage assist mode in dependence at least in part on a first pressure signal indicative of the pressure of one or more tires, wherein when the system determines that a tire is suffering leakage the system is configured to establish a gas flow path between the tire and a remote pressure sensor and to measure a pressure of gas in the tire by means of the remote pressure sensor by reference to a second pressure signal indicative of a pressure measured by the remote pressure sensor.

18 Claims, 6 Drawing Sheets

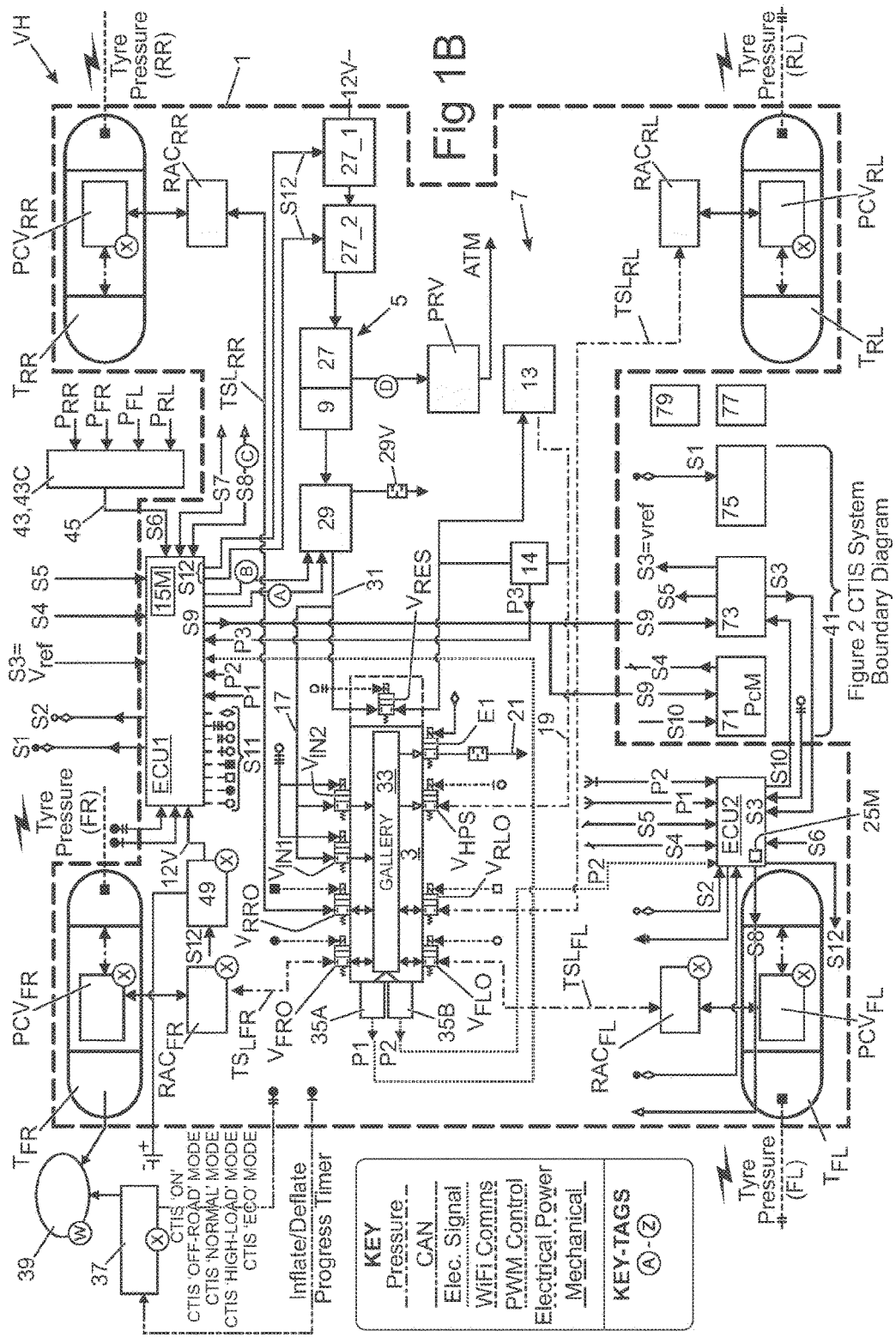

KEY-TAGS Ⓐ-Ⓩ for Figure 1B

Ⓐ Purge Solenoid Valve power Supply
Ⓑ Heater Power Supply
Ⓒ Safe State Status
Ⓓ Pressurised Air (wet)

| Process/Control Elements Ⓥ |
| System Goal Ⓦ |
| Output/Actuation Elements Ⓧ |
| Input/Sensing Elements Ⓩ |

Fig 1C

CONTROLLER FOR A MOTOR VEHICLE AND METHOD

TECHNICAL FIELD

The present invention relates to central tire inflation systems (CTIS's) and to a related method.

BACKGROUND

Central tire inflation systems (CTIS's) were originally developed for military applications, in particular for military applications concerning off-road military wheeled trucks and trailers. However, CTIS's are nowadays incorporated into non-military vehicles such as specialist construction equipment and some agricultural vehicles.

A CTIS typically comprises a compressed air source located on-board the vehicle and connected to one or more tires. Tire pressure can therefore be adjusted by operating the CTIS. The CTIS delivers compressed air to tire supply lines. In some examples, the supply lines are integrated into the vehicle axles. Various valves are provided in the CTIS to control flow of compressed air.

At least in certain embodiments, the present invention aims to solve, or at least mitigate, at least some problems that can be identified in the prior art, and/or to provide an improved CTIS and/or CTIS control strategy compared to the prior art.

SUMMARY OF THE INVENTION

Aspects of the present invention relate to a controller for a CTIS; to a CTIS; to a vehicle; to a related method; to a carrier medium. To a computer program product, to a computer readable medium and to a processor.

Embodiments of the invention may be understood with reference to the appended claims.

In one aspect of the invention for which protection is sought there is provided a controller for a motor vehicle central tire inflation system, the controller being configured to control the system to cause inflation and deflation of one or more tires, the controller being configured to cause the system to operate in a selected one of a plurality of operating modes in each of which the system is configured to set a pressure of one or more tires of the vehicle to a predetermined target tire pressure value, wherein the operating modes include a leakage assist mode in which the controller causes the system to inflate at least one tire to a predetermined leakage assist pressure value and to attempt to maintain the tire pressure at the predetermined leakage assist pressure value, the controller being configured automatically to cause the system to assume the leakage assist mode if it is determined that the at least one tire is suffering leakage, the controller being configured to determine that a tire is suffering leakage in dependence at least in part on a first pressure signal indicative of the pressure of the at least one tire, wherein the system comprises at least one pressure sensor remote from the tires for measuring pressure, wherein when the system determines that a tire is suffering leakage according to the first pressure signal the system is configured to establish a gas flow path between the tire and the remote pressure sensor and to measure a pressure of gas in the tire by means of the remote pressure sensor by reference to a second pressure signal indicative of a pressure measured by the remote pressure sensor, wherein if the pressure of gas in the tire according to the second pressure signal is sufficiently similar to the pressure of gas in the tire according to the first pressure signal the system is configured to determine that the tire is suffering leakage and to assume the leakage assist mode.

Embodiments of the present invention have the advantage that the central tire inflation system automatically detects leakage of gas from a tire and attempts to maintain the tire at a pressure sufficient to enable the vehicle to continue operating without requiring the driver to manually inflate the tires or abandon vehicle operations.

It is to be understood that the controller may be configured to determine that the pressure values according to the first and second pressure signals are sufficiently similar if the pressure values according to the first and second pressure signals are within a predetermined amount of one another.

Optionally, the predetermined leakage assist pressure value is higher than the target value for the mode in which the vehicle operated prior to assuming the leakage assist mode.

This feature has the advantage that a risk that the tire pressure falls below the target pressure for the prevailing mode may be reduced because a tire pressure higher than the target pressure has been established. If for any reason the central tire inflation system becomes inoperable, the driver may still have sufficient time to drive the vehicle to a repair facility to fix the leakage that has been detected before the tire pressure falls below the target value, or below an acceptable value for the required journey such as below a legal minimum.

Alternatively, the predetermined leakage assist pressure value may be substantially equal to the target value for the mode in which the vehicle operated prior to assuming the leakage assist mode.

In some embodiments the predetermined leakage assist pressure value may be substantially equal to the target value for the mode in which the vehicle operated prior to assuming the leakage assist mode.

In a further aspect of the invention for which protection is sought there is provided a controller for a motor vehicle central tire inflation system, the controller being configured to control the system to cause inflation and deflation of one or more tires, the controller being configured to cause the system to operate in a selected one of a plurality of operating modes in each of which the system is configured to set a pressure of one or more tires of the vehicle to a predetermined target tire pressure value, wherein the operating modes include a leakage assist mode in which the controller causes the system to inflate at least one tire to a predetermined leakage assist pressure value and to attempt to maintain the tire pressure at the predetermined leakage assist pressure value, the controller being configured automatically to cause the system to assume the leakage assist mode if it is determined that the at least one tire is suffering leakage, the controller being configured to determine that the at least one tire is suffering leakage in dependence at least in part on a first pressure signal indicative of the pressure of the at least one tire, wherein the predetermined leakage assist pressure value is higher than the target value for the mode in which the vehicle operated prior to assuming the leakage assist mode.

Optionally, the system comprises at least one pressure sensor remote from the tires for measuring pressure, wherein when the system determines that a tire is suffering leakage according to the first pressure signal the system is configured to establish a gas flow path between the tire and the remote pressure sensor and to measure a pressure of gas in the tire by means of the remote pressure sensor by reference to a second pressure signal indicative of a pressure measured by the remote pressure sensor, wherein if the pressure of gas in the tire according to the second pressure signal is sufficiently similar to the pressure of gas in the tire according to the first pressure signal the system is configured to determine that the tire is suffering leakage and to assume the leakage assist mode.

It is to be understood that the controller may be configured to determine that the pressure values according to the first and second pressure signals are sufficiently similar if the pressure values according to the first and second pressure signals are within a predetermined amount of one another.

It is to be understood that, in systems according to the preceding aspects, the controller may be configured to, if at least one tire is determined to be suffering leakage, inflate the pressure of the at least one tire suffering leakage to the predetermined leakage assist pressure value. In some embodiments, if any tire is suffering leakage, all tires are inflated to a respective predetermined leakage assist pressure value. In some embodiments, leakage assist mode is not assumed if more than one tire is determined to be suffering leakage.

The system may be configured automatically to cause the system to assume the leakage assist mode when each of a predetermined group of one or more conditions are met, the predetermined group including the condition that the tire pressure value has fallen below a predetermined tire pressure value.

Optionally, the predetermined tire pressure value is in the range from 0.1 bar to 0.5 bar.

Optionally, the predetermined group includes the condition that the tire pressure is decreasing at a rate exceeding a predetermined rate.

Optionally, the controller is configured automatically to cause the system to assume the leakage assist mode when each of a predetermined group of one or more conditions are met, the predetermined group including the condition that the tire pressure is decreasing at a rate exceeding a predetermined rate.

Optionally, the predetermined rate is in the range from 0.2 mbar/hour to 0.4 bar/hour.

The predetermined rate may be in the range from 0.4 mbar/hour to 0.4 bar/hour.

The controller may be configured not to operate in the leakage assist mode if it is determined that more than one tire is suffering leakage.

Optionally, the controller is configured to cause the central tire inflation system to assume a safe state in which operation in which at least one system operating mode is prevented when one or more predetermined conditions are met, the controller being configured to cause the system to assume the leakage assist mode if it is determined that a tire is suffering leakage and the system has not assumed a safe state that prevents operation in the leakage assist mode.

The controller may be configured to provide an alert to a user in the event a rate of leakage of gas from a tire is determined to exceed a predetermined value.

The alert to the user may be an indication that a tire is suffering severe pressure loss requiring immediate attention.

Optionally, the predetermined value is in the range from 0.2 bar/hour to 0.5 bar/hour.

Other pressure loss rates may be useful in some embodiments.

Optionally, the first pressure signal indicative of the pressure of one or more tires is obtained by reference to at least one in-wheel tire pressure sensor of a wheel.

The at least one in-wheel tire pressure sensor may be part of a tire pressure monitoring system (TPMS). The at least one in-wheel tire pressure sensor may be separate from one or more pressure sensors employed by the central tire inflation system when inflating and deflating tires.

In one aspect of the invention for which protection is sought there is provided a vehicle comprising a body, a plurality of wheels, a powertrain to drive said wheels, a braking system to brake said wheels, and a system according to any preceding claim.

This feature has the advantage that a risk that the tire pressure falls below the target pressure for the prevailing mode may be reduced because a tire pressure higher than the target pressure has been established. If for any reason the central tire inflation system becomes inoperable, the driver may still have sufficient time to drive the vehicle to a repair facility to fix the leakage that has been detected before the tire pressure falls below the target value, or below an acceptable value for the required journey such as below a legal minimum.

Alternatively, the predetermined leakage assist pressure value may be substantially equal to the target value for the mode in which the vehicle operated prior to assuming the leakage assist mode.

In some embodiments the predetermined leakage assist pressure value may be substantially equal to the target value for the mode in which the vehicle operated prior to assuming the leakage assist mode.

In a further aspect of the invention for which protection is sought there is provided a method of controlling a motor vehicle central tire inflation system, the system being configured to cause inflation and deflation of one or more tires, the method comprising causing the system to operate in a selected one of a plurality of operating modes in each of which the system is configured to set a pressure of one or more tires of the vehicle to a predetermined target tire pressure value, the method further comprising automatically causing the system to assume a leakage assist mode if it is determined that a tire is suffering leakage, in the leakage assist mode the method comprising causing the system to inflate the tires to a predetermined leakage assist pressure value and to attempt to maintain the tire pressure at the predetermined leakage assist pressure value, the method comprising determining that a tire is suffering leakage in dependence at least in part on a first pressure signal indicative of the pressure of one or more tires.

In one aspect of the invention for which protection is sought there is provided a controller for a motor vehicle central tire inflation system, the controller being configured to control the system to cause inflation and deflation of one or more tires, the controller being configured to cause the system to operate in a selected one of a plurality of operating modes in each of which the system is configured to set a pressure of one or more tires of the vehicle to a predetermined target tire pressure value, wherein the operating modes include a leakage assist mode in which the controller causes the system to cause inflation of a tire, the controller being configured automatically to cause the system to assume the leakage assist mode if it is determined that a tire is suffering leakage, the controller being configured to determine that a tire is suffering leakage in dependence at least in part on a first pressure signal indicative of the pressure of one or more tires, wherein the system comprises at least one pressure sensor remote from the tires for measuring pressure, wherein when the system determines that a tire is suffering leakage according to the first pressure signal the system is configured to establish a gas flow path between the tire and the remote pressure sensor and to measure a pressure of gas in the tire by means of the remote pressure sensor by reference to a second pressure signal indicative of a pressure measured by the remote pressure sensor, wherein if the pressure of gas in the tire according to the second pressure signal is sufficiently similar to the pressure of gas in the tire according to the first pressure signal the system is configured to determine that the tire is suffering leakage and to assume the leakage assist mode.

Optionally, the controller is configured, in the leakage assist mode, to inflate at least the tire suffering leakage to a predetermined leakage assist pressure value and to attempt to maintain the tire pressure at the predetermined leakage assist pressure value.

The controller may attempt to inflate each tire to a predetermined leakage assist tire pressure even if a tire is not suffering leakage, when it is determined that at least one tire, optionally only one tire, is suffering leakage.

In a further aspect of the invention for which protection is sought there is provided a controller for a motor vehicle central tire inflation system, the controller being configured to control the system to cause inflation and deflation of one or more tires, the controller being configured to cause the system to operate in a selected one of a plurality of operating modes in each of which the system is configured to set a pressure of one or more tires of the vehicle to a predetermined target tire pressure value, wherein the operating modes include a leakage assist mode in which the controller causes the system to cause inflation of a tire, the controller being configured automatically to cause the system to assume the leakage assist mode if it is determined that a tire is suffering leakage, the controller being configured to determine that a tire is suffering leakage in dependence at least in part on a first pressure signal indicative of the pressure of one or more tires, wherein the predetermined leakage assist pressure value is higher than the target value for the mode in which the vehicle operated prior to assuming the leakage assist mode.

Optionally, the controller is configured, in the leakage assist mode, to inflate at least the tire suffering leakage to a predetermined leakage assist pressure value and to attempt to maintain the tire pressure at the predetermined leakage assist pressure value.

The controller may attempt to inflate each tire to a predetermined leakage assist tire pressure even if a tire is not suffering leakage, when it is determined that at least one tire, optionally only one tire, is suffering leakage.

In one aspect of the invention for which protection is sought there is provided a carrier medium carrying computer readable code for controlling a vehicle to carry out the method of another aspect.

In one aspect of the invention for which protection is sought there is provided a computer program product executable on a processor so as to implement the method of another aspect.

In one aspect of the invention for which protection is sought there is provided a computer readable medium loaded with the computer program product of another aspect.

In one aspect of the invention for which protection is sought there is provided a processor arranged to implement the method of another aspect.

It is to be understood that the controller or controllers described herein may comprise a control unit or computational device having one or more electronic processors. The system may comprise a single control unit or electronic controller or alternatively different functions of the controller may be embodied in, or hosted in, different control units or controllers. As used herein the term "control unit" will be understood to include both a single control unit or controller and a plurality of control units or controllers collectively operating to provide the stated control functionality. A set of instructions could be provided which, when executed, cause said computational device to implement the control techniques described herein. The set of instructions could be embedded in said one or more electronic processors. Alternatively, the set of instructions could be provided as software to be executed on said computational device. The controller may be implemented in software run on one or more processors. One or more other controllers may be implemented in software run on one or more processors, optionally the same one or more processors as the controller. Other arrangements are also useful.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

For the avoidance of doubt, it is to be understood that features described with respect to one aspect of the invention may be included within any other aspect of the invention, alone or in appropriate combination with one or more other features.

BRIEF DESCRIPTION OF THE DRAWINGS

One or more embodiments of the invention will now be described, by way of example only, with reference to the accompanying figures in which:

FIG. 1B is a vehicle system boundary diagram representing the CTIS shown in FIG. 1A;

FIG. 1C is a Key identifying the lettered Tags used in FIG. 1B;

DETAILED DESCRIPTION

Figure 1A:
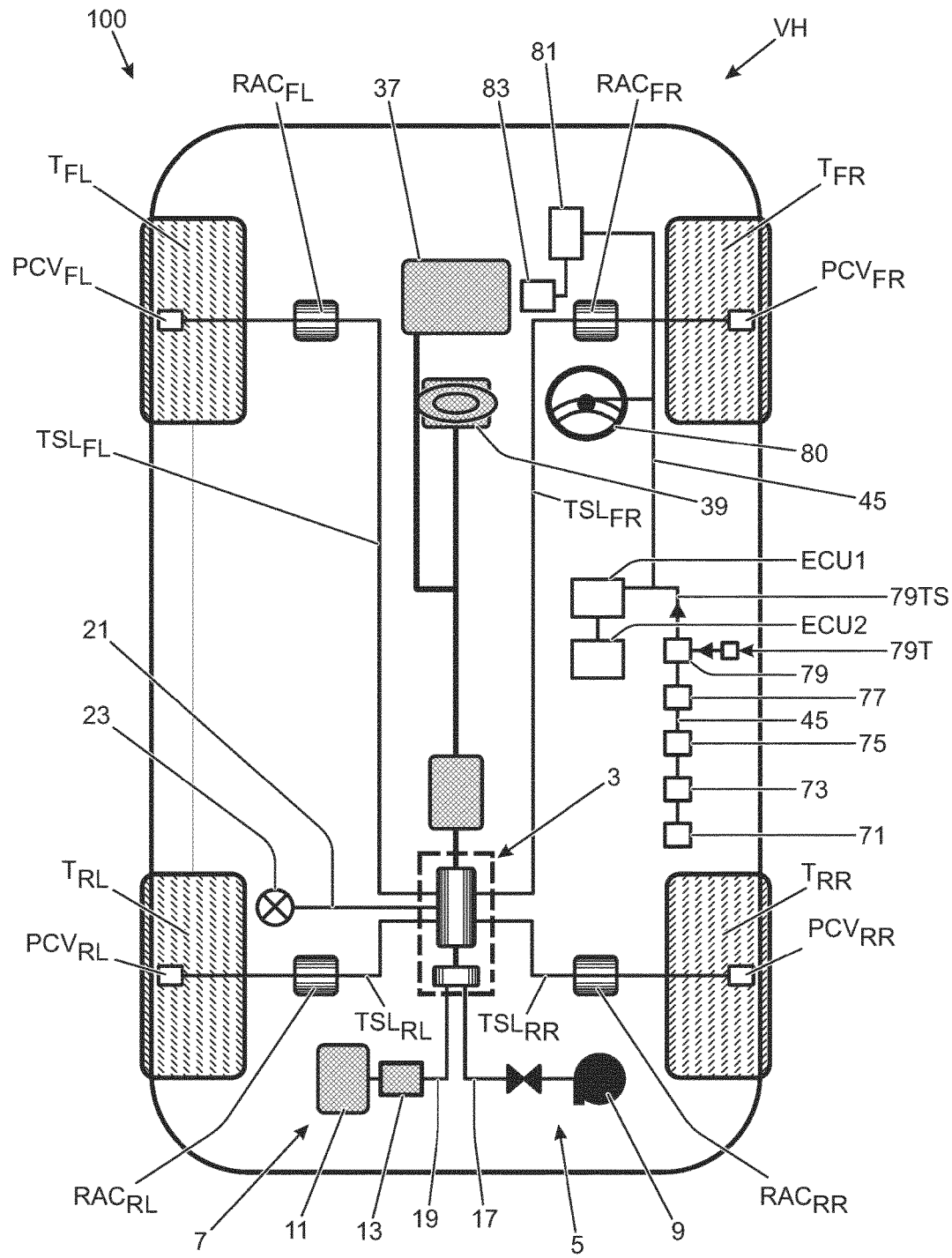
FIG. 1A is a schematic representation of a central tire inflation system (CTIS) according to an embodiment of the invention.

In the following description and in the drawings, reference letters are used to collectively or un-specifically identify equivalent or essentially equivalent components. Where necessary, a specific component in a collection of equivalent or essentially equivalent components may be identified by suffixing a reference letter in subscript format.

It is to be understood that by the term 'key off' (power mode 0) herein is meant the assumption by the vehicle or portion thereof of a configuration requiring the presence of a security device such as a key, key fob or other security device in order for the vehicle to be restarted at 'key on'. For example if the vehicle has an internal combustion engine the engine is shut down at key off in a manner that requires a direct driver intervention other than release of a brake or actuation of an accelerator control in order to restart the engine, e.g. a key turn, or the press of a start button when a security device is in the proximity of the vehicle, to restart the engine, i.e. not an engine shut down as part of an automated stop/start function designed to save fuel/reduce emissions when the vehicle is stationary but when continued movement is intended.

In the present embodiment the vehicle VH is configured to assume one of a plurality of power modes PM at a given moment in time. In each power mode the vehicle VH is operable to allow a predetermined set of one or more operations to be performed. For example, the vehicle VH may allow a predetermined one or more vehicle subsystems such as an infotainment system, a windscreen demist subsystem and a windscreen wiper control system to be activated only in a respective one or more predetermined power modes. In one or more of the power modes the vehicle VH may be configured to inhibit one or more operations, such as turning on of the infotainment system. In the present embodiment power mode zero (PM0) corresponds to a shutdown condition in which controllers of the vehicle VH assume either an off state or a quiescent state. Systems such as an infotainment system are not operable when in power mode PM0.

A central tire inflation system (CTIS) 1 in accordance with an embodiment of the present invention will now be described with reference to the accompanying Figures. As shown schematically in FIG. 1A, the CTIS 1 is installed in a vehicle VH having four wheels W each having a tire T mounted on a wheel hub (not shown). The wheels W (and the tires T) are identified herein based on their relative position on the vehicle VH, namely: front left (FL), front right (FR), rear left (RL) and rear right (RR). This nomenclature is employed to identify the components of the CTIS 1 associated with the respective tires T. The front tires TFR, TFL are mounted on a front axle and the rear wheels TRR, TRL are mounted on a rear axle of the vehicle.

The CTIS 1 comprises four pneumatic control valves PCV fixedly mounted to the wheel hubs and arranged to control the supply of compressed air to and from a respective tire cavity. The pneumatic control valves PCV are pneumatically operated in response to changes in the pressure in the associated tire supply line TSL. Specifically, the pneumatic control valves PCV are operable to cycle sequentially (i.e. to toggle) between an open state and a closed state in response to the application of a pressure exceeding a valve activation pressure. The pneumatic control valves PCV are stable in both the open and closed state via a latching mechanism, i.e. they can each be considered as a pressure actuated bi-stable valve. Herein the application of air at a pressure and time sufficient to switch the valve from one state to its other state, i.e. from open to closed or from closed to open, is referred to as "toggling" the valve, and the application of said air in this manner is referred to as a high pressure (pneumatic) control signal. WO2011028346 discloses a suitable pneumatic control valve PCV for this application.

The CTIS 1 further comprises a valve block 3 for controlling the supply of compressed air to each of the pneumatic control valves PCV. The valve block 3 is fluidly coupled to a first compressed air source 5 via inlet valves VIN1, VIN2 and a second compressed air source 7 via high pressure supply valve VHPS. The first compressed air source 5 provides air at a high flow rate and low pressure (HF/LP) whilst the second compressed air source 7 is operable to provide air at a higher pressure. As described herein, the first and second compressed air sources 5, 7 are distinct from each other. In the present embodiment, the first compressed air source 5 comprises a compressor 9 whilst the second compressed air source 7 comprises a reservoir 13, selectively pressurized by the compressor 9 by opening a reservoir supply valve VRES and ensuring inlet valves VIN1, VIN2, VHPS are closed.

The CTIS 1 is configured to pressurize the reservoir 13 to a predetermined pressure so as to enable the reservoir 13 to provide air at higher pressure than that supplied directly to the wheels to inflate the tires T. Tire inflation is accomplished by closing reservoir valve VRES, opening valve block inlet valves VIN1, VIN2 and opening one or more valve block outlet valves VFRO, VFLO, VRRO, VRLO. The outlet valves supply air to tires TFR, TFL, TRR and TRL respectively.

The pressure of air supplied by a compressor 27 (described in more detail below) is governed by the maximum required downstream pressure in the tires T. As will be appreciated the compressor 27 will continue to supply air and build pressure until a downstream sensor detects that the required pressure has been reached at which point the CTIS 1 terminates operation of the compressor 27. It is to be understood that the volumetric flow rate will be higher at lower pressures than at higher pressures. In some alternative embodiments the reservoir 13 of the second compressed air source 7 may be charged with air by a second compressor (not shown) which could form part of the vehicle air suspension and could be controlled indirectly by the CTIS 1, for example via one of two electronic control units (ECUs) ECU1, ECU2 of the CTIS 1 discussed in more detail below.

The activation pressure of each said pneumatic control valve PCV is below the pressure of the second compressed air source 7. In this manner the second compressed air source 7 can be applied for a short duration to switch one or more selected pneumatic control valves PCV from a closed state to an open state, and vice versa.

A reservoir pressure sensor 14 is provided in fluid communication with the reservoir 13 for measuring the pressure of air in the reservoir 13. The sensor 14 outputs a signal P3 indicative of the pressure of air in the reservoir 13 to main ECU ECU1. Thus the ECU1 is able to ensure that the pressure of air in the reservoir 13 is sufficient to operate the 0 when required.

As noted above, the CTIS 1 has two ECU's, ECU1 and ECU2. The main ECU1 is referred to as ECU1 whilst the second ECU which purpose is to monitor ECU1 is referred to as ECU2. ECU1 is configured to provide electrical output signals S11 to control operation of the electrically actuated valves of the CTIS 1 including valves of the valve block 3 and signals S12 to control compressor operation of the compressor 9 via first and second compressor motor relay switches 27_1, 27_2 respectively. Monitor ECU ECU2 is configured to provide a monitoring function and is arranged to terminate a supply of power to the ECU1 in the event that certain predetermined conditions are met, described in more detail below. Power to the ECU1 is provided by means of a power supply relay 49 (FIG. 1B). The power supply relay 49 may be caused to terminate supply of power to ECU1 in dependence on signal S12 output by the monitor ECU ECU2. The monitor ECU ECU2 also communicates with ECU1 in the event that the monitor ECU ECU2 determines, by reference to signals received by the monitor ECU ECU2, that behavior of the main ECU ECU1 is not as expected for normal operation of the main ECU ECU1.

The ECU1 outputs a signal S1 indicative of the operating mode of the CTIS 1 at a given moment in time, a signal S2 indicative of the actual and target pressures of the tires TFR, TRL of front wheels W of the vehicle VH, and an ECU1 speed limit request signal S9 when required. Signal S9 indicates whether a first (DS1) or second (DS2) speed limit value V_DS1, V_DS2 is requested by the main ECU1. In the present embodiment, V_DS1 is 40 km/h whilst V_DS2 is 90 km/h. Other values of speed limit value may be useful in some embodiments.

The signal S9 is output by the main ECU1 to an ABS module 73 and PCM module 71. In turn, ABS module 73 outputs to ECU1 and ECU2 a signal S5 indicative of the value of any speed limit (DS1 or DS2) that is being imposed on vehicle operations by the ABS module 73 at a given moment in time. Similarly, the PCM module 71 outputs to ECU1 and ECU2 a signal S4 indicative of the value of any speed limit (DS1 or DS2), if any, that is being imposed on vehicle operations by the PCM module 71 at a given moment in time.

As shown in FIG. 1B, the monitor ECU ECU2 also outputs a monitor ECU ECU2 speed limit request signal S10. Signal S10 indicates whether the lower (DS1) or upper (DS2) speed limit value is requested by the monitor ECU2. The signal S10 is output by the monitor ECU2 to the ABS module 73 and to the powertrain control module (PCM) 71. In the present embodiment the PCM module 71 and ABS module 73 are each configured to impose a speed limit on vehicle operations if both of signals S9 and S10 indicate that a speed limit request is being made by both of the ECU's ECU1, ECU2. Both ECU's ECU 1 and ECU 2 use signals S1 and S2 to physically check the driver's request regarding operating mode and the plausibility of a speed limit (if any of the off road modes is selected by the driver). PCM module 71 and ABS module 73 send signals S4 and S5 prior to application of a speed limit, thus validating the correlation of S10 and S9. Upon correlation of S10 and S9 ECU2 informs ECU 1 via signal S7 that the speed limit has been applied by the PCM module 71 and ABS module 73, hence the new mode selected by the driver can be now enabled (ECU1 and ECU2 requested the same speed limit). If either of S4 or S5 are in a fault state (due to S9 and S10 not correlating, or an internal ABS/PCM fault) then ECU1 assume the corresponding safe state. Should ECU1 fail to do this, ECU2 will enter a higher safe state which includes actuating power supply relay 49 which cuts the supply of power to ECU1. Furthermore, all electrically actuated valves of the CTIS1 have a spring return mechanism to cause them to assume a close state in the event that a supply of power to the valves is cut.

ABS module 73 also calculates a value of vehicle reference speed VREF and outputs a signal S3 indicative of the prevailing value of VREF. In the present embodiment the value of VREF is set equal to the speed of the second slowest turning road wheel, the speed of the road wheels being determined by means of wheel speed sensors (not shown). In the present embodiment, signal S3 is received by each of the ECU's ECU1, ECU2.

A tire supply line TSL is provided to supply compressed air from the valve block 3 to each tire T. Specifically, the CTIS 1 comprises a front left tire supply line TSLFL, a front right tire supply line TSLFR, a rear left tire supply line TSLRL and a rear right tire supply line TSLRR. The pneumatic control valves PCV are provided at the ends of the tire supply lines TSL to control the supply of compressed air to the respective tires T. A section of each tire supply line TSL extends along the respective vehicle axles to supply compressed air to the pneumatic control valves PCV mounted in each wheel hub. A rotary air coupling (RAC) is provided in each tire supply line TSL to provide a fluid coupling to supply compressed air from the valve block 3 to the section of each tire supply line TSL disposed in the vehicle axle.

The valve block 3 will now be described in more detail with reference to FIG. 1B. The valve block 3 comprises a pair of low pressure inlet valves VIN1, VIN2 and a high pressure inlet valve VHPS. The low pressure inlet valves VIN1, VIN2 operatively control the supply of compressed air from the first compressed air source 5 which is connected to the valve block 3 by a first supply line 17. The high pressure inlet valve VHPS operatively controls the supply of compressed air from the second compressed air source 7 which is connected to the valve block 3 by a second supply line 19.

The valve block 3 comprises four outlet valves (collectively referenced as VO) for controlling the supply of compressed air to the respective tire supply lines TSL. In particular, the valve block 3 comprises: a front left outlet valve VFLO for controlling the supply of compressed air to the front left tire supply line TSLFL; a rear left outlet valve VRLO for controlling the supply of compressed air to the rear left tire supply line TSLRL; a front right outlet valve VFRO for controlling the supply of compressed air to the front right tire supply line TSLFR; and a rear right outlet valve VRRO for controlling the supply of compressed air to the rear right air supply line TSLRR. The outlet valves VO are operable independently of each other to enable the selective supply of compressed air to one or more of the tire supply lines TSL.

The valve block 3 also comprises an exhaust valve E1 coupled to an exhaust line 21. The exhaust line 21 terminates with an exhaust outlet which is open to atmosphere to vent exhaust air from the CTIS 1. The exhaust valve E1 is operable to control the flow of exhaust air to the exhaust line 21, for example during tire deflation.

The inlet valves VIN1, VIN2, VHPS, the outlet valves VO and the exhaust valve E1 are solenoid valves having a normally-closed configuration. The inlet valves VIN1, VIN2, VHPS, the outlet valves VO and the exhaust valve E1 are operable independently of each other and are actuated by control signals received from the ECU1 as noted above.

The compressor 9 is a dedicated compressor for the CTIS 1 and is controlled directly by the ECU1. The compressor 9 is driven by an electric motor 27 and has an operating pressure of approximately 9 bar. A dryer unit 29 is coupled to the compressor 9 partway through a first compressed air supply line 31 connecting the first compressor 9 to the valve block 3. The dryer unit 29 is configured to heat air that enters the dryer 29 in order to dry the air. A purge valve 29V is coupled to the dryer unit 29, allowing venting of air in the dryer unit 29 to atmosphere when it is required to purge the unit 29. The purge valve 29V is also controlled by the ECU1.

A fluid gallery 33 is provided in the valve block 3. The gallery 33 is open to each of: the outlet valves VO, the inlet valves VIN1, VIN2, VHPS and the exhaust valve E1. The valve block 3 houses a pair of pressure sensors 35A, 35B arranged to measure the pressure in the gallery 33. The pressure sensors 35A, 35B output signals P1, P2 respectively to each of the ECUs ECU1, ECU2. It is to be understood that two pressure sensors 35A, 35B are provided in case one sensor becomes inoperable or outputs a false signal. The ECU's ECU1, ECU2 are configured to monitor the signals P1, P2 and to determine which of the signals is false in the event that the signals indicate substantially different pressure values P1, P2.

The gallery 33 can be selectively placed in fluid communication with one or more of the tire supply lines TSL by opening one or more of the outlet valves VO. In the present embodiment, the pressure sensors 35A, 35B may be employed to measure the pressure in the individual tire supply lines TSL by placing the tire supply line TSL in fluid communication with the gallery 33. By opening the pneumatic control valve PCV associated with that tire supply line TSL, the pressure sensor 35 can measure the air pressure in the tire cavity (hereinafter referred to, for simplicity, as the tire pressure).

As described above, the gallery 33 receives compressed air from each of said first and second compressed air sources 9, 13 via the low pressure inlet valves VIN1, VIN2 and high pressure inlet valve VHPS as described above. The low pressure inlet valves VIN1, VIN2 are operable to control the supply of compressed air from the first compressed air source 5 to the gallery 33. The high pressure inlet valve VHPS is operable to control the supply of compressed air from the second compressed air source 7 to the gallery 33. In use, the first compressed air source 5 is the primary source of compressed air for inflating the tires T. One or more of the tire supply lines TSL can be placed in communication with the first compressed air source 5 by opening one or both of the low pressure inlet valves VIN1, VIN2 and the appropriate one or more outlet valves VO. The second compressed air source 7 provides a higher pressure supply which is controlled by the second inlet valve VHPS to generate a pneumatic control signal as described above for controlling operation of one or more of said pneumatic control valves PCV to tires for which the respective outlet valves VO are open, i.e. to toggle the valves from one stable state to the other stable state. Specifically, the high pressure inlet valve VHPS is operated to generate the pneumatic control signal to cycle the pneumatic control valve(s) PCV in communication with the gallery 33. The pneumatic control valve(s) PCV cycle through their respective operating states in response to the pneumatic control signal and, therefore, can be operated to control the supply of compressed air to and from the respective tires T. By opening the pneumatic control valve(s) PCV, one or more of the tires T can be placed in communication with the respective tire supply lines TSL. The valve block 3 can be operated to place the tire supply lines TSL in communication with the first compressed air source 5 to inflate one or more of said tires T or in communication with the exhaust line 21 to deflate one or more of said tires T. Furthermore, the valve block 3 can be operated to measure the pressure of the air in the tires T via the first and second pressure sensors 35A, 35B.

To measure an individual tire pressure of a wheel having a closed PCV, the valve block 3 is operated to close the low pressure and high pressure inlet valves VIN1, VIN2, VHPS, and the exhaust valve E1. The outlet valve VO corresponding to the tire supply line TSL for the particular tire is opened to place the tire supply line TSL in fluid communication with the gallery 33. A pneumatic control signal is then generated by operating the high pressure inlet valve VHPS to open the pneumatic control valve PCV for that tire T. The tire T is thereby placed in communication with the gallery 33 via the corresponding tire supply line TSL. The pressure sensors 35A, 35B then measure the air pressure in the gallery 33 to determine the tire pressure for that particular tire T. Once the pressure has been measured, if no further action is required in relation to that tire a pneumatic control signal may be generated by operating the high pressure inlet valve VHPS to close the pneumatic control valve PCV.

The CTIS 1 according to the present embodiment uses two pressure sensors 35A, 35B although it is to be understood that a single pressure sensor could be provided instead. Alternatively, more than two pressure sensors may be provided. In some embodiments, for example, a respective pressure sensor 35 could be provided in communication with each tire supply line TSL. Equally, a separate valve block 3 could be provided for each tire T or for each axle.

The ECU1 is programmed to control the overall operation of the CTIS 1. The ECU1 is configured to determine an inflation time or a deflation time for a given required inflation or deflation operation. The inflation time is the period of time over which compressed air must be supplied from the first compressed air source 5 to the one or more tire(s) T to reach the target tire pressure. The inflation time is a function of one or more of the following: the pressure differential between the target tire pressure and the current tire pressure (the current tire pressure being the tire pressure prior to inflation); the operating characteristics of the first compressed air source 5 (e.g. nominal pressure, flow rate and density); the number of tires T which are being inflated at any given time (if more than one tire T can be inflated simultaneously); and the volume and/or temperature of the tire cavities.

The deflation time is the period of time over which compressed air must be vented from the one or more tire(s) T through the exhaust valve E1 to reach the target tire pressure. The deflation time is also a function of the number of tires T being simultaneously deflated, of the current tire pressure (i.e. the tire pressure before deflation), of the target tire pressure and/or the pressure differential to be achieved by tire deflation and/or of the volume and/or temperature of the tire cavities.

In the present embodiment, the ECU1 retrieves the inflation time and/or the deflation time from a look-up table stored in a memory device accessible to the ECU1. The look-up table can take the form of a double entry table indexed according to the current tire pressure and the target tire pressure. Based on the current tire pressure and the target tire pressure, the ECU1 can retrieve from the look-up table a value corresponding to, or representative of, the predetermined tire inflation time for a given flow rate and air supply air pressure. Alternatively the look-up table may give a volume of air required and the ECU1 may calculate the inflation time based on measured or estimated pressures, air density and flow rates and the retrieved volumetric air requirement. Other methods may be useful in some embodiments.

The ECU1 controls tire inflation and/or deflation by opening and closing, as appropriate, the various valves VO, VIN1, VIN2, VHPS, E1 of the valve block 3. Tire inflation and deflation can thus potentially be performed one tire T at a time, or according to any combination of tires T simultaneously. In the present embodiment, however, the ECU1 is programmed to simultaneously deflate all the tires T, or in pairs, and to inflate the tires T one at a time or, simultaneously in pairs. If deflated/inflated in pairs, the pairs of tires T are selected according to their location at the front or rear of the vehicle VH. In this event, the tires T are said to be deflated/inflated by the CTIS 1 'per axle'.

In the present embodiment, the ECU1 uses an algorithm to refer the current and target tire pressures to a nominal tire temperature of 25° C. and to the case of tire inflation of an individual tire T. Alternatively, different look-up tables each corresponding to a tire temperature and/or to the case of tire inflation for two or more tires T could be used. Compressed air losses in the CTIS 1 may affect the period of time taken for the CTIS 1 to achieve a predetermined pressure. The values stored in the look-up table could be dynamically updated to take into account the effects of said losses. The values could, for example, be updated via one or more self-learning algorithms.

The main ECU1 is in addition configured to provide information relating to the status and/or operation of the CTIS 1 to a vehicle user via a human-machine interface (HMI) 37. A dashboard (not shown) of the vehicle VH is equipped with a visual output, for example a tire operation dial 39, to provide a user with information as to whether compressed air is being supplied to, or exhausted from, the tire cavities. This visual output is considered to form part of the HMI 37.

The main ECU1 is programmed to implement the control strategies and procedures described herein. In the present embodiment, the ECU1 receives from a tire pressure monitoring system (TPMS) 43, via a vehicle controller area network (CAN) bus 45, real-time information relating to the current tire pressures for the four tires T of the vehicle VH by means of a signal 56. Signal 56 includes an indicator of the identity of the tire pressure sensor from which a pressure signal is obtained and the identity of the wheel to which it is attached (e.g. front left or front right), the measured pressure of the tire and the measured temperature of the tire. The pressure sensors 35A, 35B coupled to the valve block 3 communicate directly with the main and monitor ECUs ECU1, ECU2 via electric signals P1, P2 representative of the pressure measured by the pressure sensor 35 in the gallery 33 of the valve block 3. As described earlier, the pneumatic control valves PCV and the various outlet valves VO of the valve block 3 can be configured such that the pressure sensors 35A, 35B measure a pressure which is representative of the pressure inside each of the tires T. The TPMS 43 also monitors the temperature inside the tires T so that the tire pressures can be referred to a nominal temperature of 25 degrees C. using appropriate algorithms, for example a thermocouple or other thermal sensor may be located in or through the hub of each wheel.

The ECU1 implements tire inflation and/or deflation strategies as described herein on the basis of the relationship between the target tire pressures and the current tire pressures as measured by the TPMS 43 and/or valve block pressure sensors 35A, 35B. To do this, the ECU1 is required to control the various mechanical components of the CTIS 1. As seen in FIG. 1B, the ECU1 is configured to control the outlet valves VO via pulse width modulation (PWM) control lines S11. Via the same PWM control lines S11, the ECU1 also controls a purging function of the dryer unit 29, which purges the dryer unit 29 or moist air before allowing dried air to flow to the valve block 3, the electric motor 27 which drives the compressor 9, the low pressure and high pressure inlet valves VIN1, VIN2, VHPS and the exhaust valve E1. As described herein, the target tire pressures can be manually selected by the driver of the vehicle via the human-to-machine interface (HMI) 37 or they can be automatically selected by the vehicle control system 41 on the basis of other information including vehicle driving modes. The HMI 37 communicates with the ECU1 via the vehicle CAN bus 45. It is to be understood that, as an alternative to PWM control, full cycle on/off solenoid valves could be used.

Figure 2:
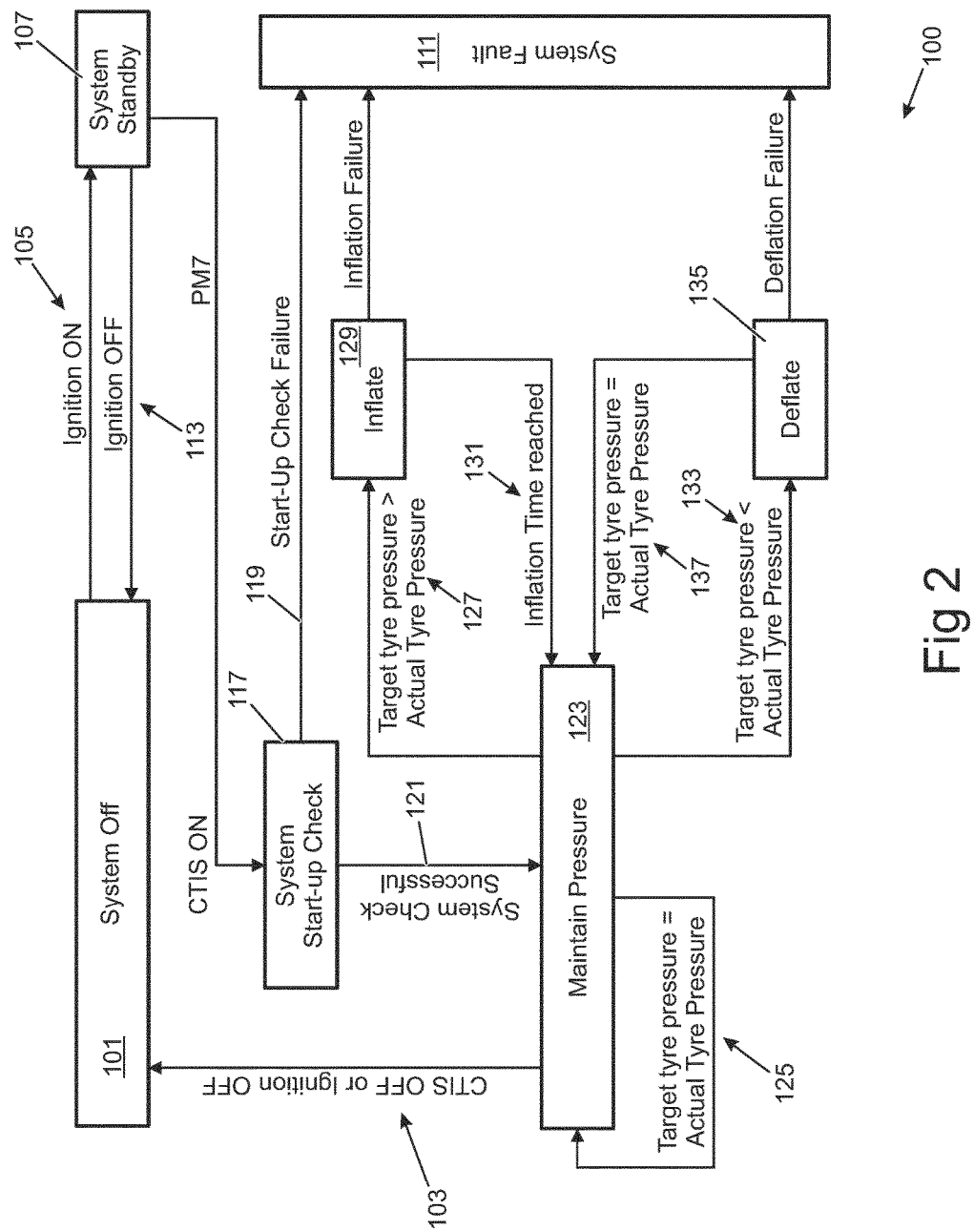
FIG. 2 is a high level block diagram illustrating the operation of the CTIS described herein.

A first block diagram 100 illustrating the operating modes of the CTIS 1 is shown in FIG. 2. Explanation of operation of the CTIS 1 will be made with the CTIS 1 initially in a switched off condition 101.

In the present embodiment, the CTIS 1 can be switched off by a vehicle user command and/or by switching off the engine of the vehicle VH (CONDITION 103). When the ignition is switched on (CONDITION 105) the CTIS 1 assumes a standby condition and displays the identity of the most recent mode in which the CTIS 1 operated. If the engine is then switched on and the vehicle assumes a power mode corresponding to engine running (in the present embodiment power mode 7 (PM7)), the CTIS 1 performs a system start-up check (STEP 117) to check that the components of the CTIS 1 are correctly working together and therefore capable of delivering compressed air to the tires T. If a fault is detected whilst performing these checks (CONDITION 119) the CTIS 1 enters the System Fault Mode 111 and the vehicle user is informed accordingly. If the check is successful (CONDITION 121) the CTIS 1 enters a Maintain Pressure Mode 123. In the present embodiment the CTIS 1 then requests the user to confirm whether the user wishes to operate the CTIS 1 in a normal run mode 201NR. If the user indicates this is desired, the CTIS 1 assumes the normal run mode 201NR as described below. If the user does not indicate that this mode is desired, the CTIS 1 resumes operation in the mode in which it was operating when the CTIS 1 was last switched off.

In the Maintain Pressure Mode 123, the CTIS 1 operates to ensure that a current tire pressure substantially equals a target tire pressure for the current mode of operation of the CTIS 1 (CONDITION 125) for each of the tires T or for any selected tire combination (e.g. for the rear axle tires). If for any of the tires T the target tire pressure is greater than the current tire pressure (CONDITION 127), the CTIS 1 switches to an Inflate Mode 129. In the Inflate Mode 129, the ECU1 retrieves an inflation time from a look-up table stored in a memory of the ECU1 on the basis of the pressure difference between the target and current tire pressures.

When the inflation time has elapsed (CONDITION 131) for each tire T or for each combination of tires being simultaneously inflated, the CTIS 1 returns to the Maintain Pressure Mode 123.

If the current tire pressure is greater than the target tire pressure (CONDITION 133), the CTIS 1 enters a Deflate Mode 135. In the deflate mode, compressed air is vented from one or more tires T simultaneously and routed via one or more of the tire supply lines TSL to the valve block 3 and, from there, to atmosphere through the exhaust valve E1 via exhaust line 21. On the basis of the pressure difference between the target and current tire pressures, the ECU ECU1 retrieves the deflation time from the look-up table stored in a memory in the ECU1. When the current/actual tire pressure reaches or substantially matches the target tire pressure (CONDITION 137) the CTIS 1 returns to the Maintain Pressure Mode 123.

If a fault develops during the Inflate Mode 129, or during the Deflate Mode 135, the CTIS 1 enters the System Fault Mode 111.

The target tire pressures can vary between different tires T and for all the tires T dependent on the vehicle driving mode. This will now be described with reference to a second block diagram 200 shown in FIG. 3. The second block diagram 200 illustrates the main vehicle driving modes. There are four on-road drive modes 201, namely: an Economy Mode 201ECO; a High Speed Mode 201HS; a High Load Mode 201HL; and a Normal Run Mode 201NR. There are also three off-road driving modes 205 and a Puncture Assist Mode 221. The off-road driving modes 205 are: a deformable surface mode 1 205DS1, deformable surface mode 2 205DS2 and a Recovery Mode 205R.

In the present embodiment the Economy Mode 201ECO requires a target tire pressure of 2.8 bar for the front tires TFL, TFR and 3.0 bar for the rear tires TRR, TRL. The High Speed Mode 201HS requires a target tire pressure of 2.6 bar for the front tires TFL, TFR and 2.8 bar for the rear tires TRR, TRL. The High Load Mode 201HL requires a target tire pressure of 2.8 bar for the front tires TFL, TFR and 3.0 bar for the rear tires TRR, TRL. The Normal Run Mode 201NR requires a target tire pressure of 2.3 bar for the front tires TFL, TFR and 2.5 bar for the rear tires TRR, TRL. Off Road Mode 205DS1 requires a target tire pressure of 1.8 bar both for the front and rear tires TFL, TFR, TRR, TRL whilst Off Road Mode 205DS2 requires a target pressure 1.38 bar for all tires. The Recovery Mode 205R requires a target tire pressure of less than 1 bar both for the front and rear tires TFL, TFR, TRR, TRL. It will be apparent to the skilled person that these tire pressures are exemplary only and that actual tire pressures for different conditions will be dependent upon the specific vehicle and tires and/or other factors including vehicle load.

In the present embodiment, the Off Road modes 205DS1, 205DS2, 205R can only be assumed when vehicle speed is below the predetermined threshold speed value for each mode, being V_DS1, V_DS2 and V_R respectively.

The Recovery Mode 205R may only be assumed with the vehicle VH held stationary with a foot brake or parking brake applied. The driver of the vehicle VH must then select the recovery mode 205R using HMI 37. In the present embodiment the VH must be in one of off road modes 205DS1, 205DS2 before the recovery mode 205R may be assumed. Once in the recovery mode 205R, vehicle speed is limited to 10 kph although other speed limit values may be useful in some embodiments.

It is to be understood that in some embodiments one or more other values of target tire pressure may be useful for front and/or rear tires in one or more of the driving modes. When the vehicle switches from an Off Road Mode 205 to an On Road Mode 201, it is appropriate to inflate the tires to achieve the target tire pressure for the particular On Road Mode 201 that is to be assumed.

In the present embodiment, when the CTIS 1 is in an Off Road mode, i.e. one of modes 205DS1, 205DS2 or 205R, the ECU1 transmits a signal S9 to the PCM 71 and ABS 73 informing them of the identity of the mode 205DS1, 205DS2, 205R that has been assumed. The PCM 71 and ABS 73 are arranged to impose the corresponding speed limit V_DS1, V_DS2, V_R on the vehicle VH in response to this signal. In the event that a driver attempts to accelerate the vehicle VH above the prevailing speed limit imposed during operation in an Off Road Mode 205, the PCM 71 reduces the amount of power developed by the powertrain, for example by retarding the timing of engine fuel injection and/or reducing an amount of throttle opening. In addition the ABS 73 may in some embodiments commence application of brake torque to constrain vehicle acceleration. If vehicle speed approaches the speed limit imposed during operation in an Off Road Mode 205 with the throttle pedal released, for example whilst descending an incline, the ABS 73 is configured to cause application of brake torque in order to prevent vehicle speed from exceeding the limit imposed. Other arrangements may be useful in some embodiments.

The PCM 71 and ABS 73 transmit respective signals S4, S5 to the main and monitor ECUs ECU1, ECU2 indicating the value of speed limit (if any) being imposed by the module 71, 73 at a given moment in time.

A transition from an Off Road Mode 205 to an On Road Mode 201 may be triggered by a driver request via HMI 37.

In some alternative embodiments, rather than imposing a speed limit on vehicle operations and preventing speed from increasing above a limit value in a given mode, the transition from an Off Road Mode 205 to an On Road Mode 203 may be performed automatically when the ECU1 determines that the vehicle reference speed VREF, given by vehicle reference speed signal S3, is greater than the speed limit being imposed at a given moment in time. In some embodiments, the CTIS 1 may automatically assume a default On Road Mode 201 such as the Normal Run Mode 201NR in the event that vehicle speed exceeds the predetermined limit for the prevailing off road mode 205 in which the vehicle is operating.

In order to transition to an On Road Mode 201 from an Off Road Mode 205, the ECU1 enters an interim tire inflation mode 209. The ECU1 is configured to inflate the tires T in two distinct stages. The tire inflation procedure is performed 'per axle'.

In a first phase (STEP 211), the ECU1 causes inflation of both the front and rear tires TFL, TFR, TRR, TRL from the current tire pressures to an intermediate target tire pressure of, for example 2.0 bar. In a second phase (STEP 213), the ECU1 causes inflation of both the front and rear tires TFL, TFR, TRR, TRL from the intermediate target tire pressure to the target tire pressures of the particular On Road Mode 201 that is to be assumed, such as 2.3 bar for the front tires TFL, TFR and 2.5 bar for the rear tires TRR, TRL, in the case of the Normal Run Mode 201NR. In the described embodiment, the intermediate target tire pressure has been set to 2.0 bar to satisfy a local legal requirement. However, other selection criteria for selecting the intermediate target tire pressure could be used. The intermediate pressure will typically be a pressure at which it is appropriate for the vehicle VH to be driven on a road. It will be appreciated that the tires T could be inflated in more than two stages.

It is to be understood that the reference speed value VREF indicates the current speed of the vehicle over ground as noted above. In the present embodiment, as noted above, it is generated by the ABS module 73. The vehicle VH also has a traction control system controller 77 that is configured to implement a known traction control function.

In the present embodiment, the first phase of tire inflation (STEP 211) performed by the CTIS 1 typically requires less than one minute to inflate the tires T from their current tire pressure in a given Off Road Mode 205 to the intermediate target tire pressure of 2.0 bar and the second phase (STEP 213) typically takes longer than one minute to successively inflate the tires T from the intermediate target tire pressure of 2.0 bar to the target tire pressures specified for the selected On Road Mode 201. The first phase (STEP 211) can be performed when the vehicle/vehicle VH is still off road, or when the vehicle VH is about to enter the road, followed by the second phase (STEP 213) which is performed subsequently, for example when the vehicle is on the road.

In some embodiments, the intermediate target tire pressure may be set to the lower of the target tire pressures for the mode that is to be assumed. Thus in the case of the Normal Run Mode 201NR the intermediate target pressure may be 2.3 bar. Once all tires have been inflated to this pressure, the rear tires are then inflated to their target pressure of the Normal Run Mode 201NR, i.e. 2.5 bar.

The Recovery Mode 205R (FIG. 3) may be activated to recover the vehicle VH, for example when a vehicle belly-out event occurs. A vehicle belly-out event refers to a situation in which the vehicle body is partially or completely supported by the ground under the vehicle instead of being supported by the tires T. The Recovery Mode 205R may be activated automatically by the ECU1 or by the driver of the vehicle via the HMI 37. When the Recovery Mode 205R is activated, the ECU1 verifies whether an adjustable ride height of the vehicle is in the highest position setting and if not the main ECU ECU1 causes the suspension to raise the vehicle by transmitting a corresponding request to a body control module (BCM) 79 (FIG. 1A) via the CAN bus 45. The main ECU ECU1 then causes a reduction in the pressure of the front tires TFL, TFR and the rear tires TRR, TRL to, for example, less than 1 bar. Other pressures may be useful in some embodiments such as around 1.2 bar. The Recovery Mode 205R may only be activated when the vehicle VH is in the DS1 or DS2 Off Road Modes 205. By decreasing the tire pressure a larger surface area of the tire will come into contact with the ground that will increase traction between the wheel and the surface, thereby assisting in reducing wheel slip and moving the vehicle, whilst increasing the ride height lifts the vehicle body slightly to raise it off the ground.

The Economy Mode 201ECO can be selectively activated by the user, or automatically by the ECU1, for example based on vehicle speed in some embodiments. When the Economy Mode 201ECO is activated, the CTIS 1 operates to increase the pressure of the front tires TFL, TFR to, for example, 2.8 bar; and the rear tires TRR, TRL to, for example, 3.0 bar. If the vehicle is in an Off Road Mode 205, the interim step 209 is performed. If the vehicle is in another On Road Mode 201, any required increase in tire pressure can be performed in a single phase or multiple phases, for example to maintain the pressure differential between the front and rear tire pressures within a predefined margin.

Similarly, the High Speed mode 201HS can be selectively activated by the user, or automatically by the ECU1, for example based on vehicle speed. In some embodiments the ECU1 activates the High Speed Mode 201HS automatically if the vehicle is in an On Road Mode 201 and vehicle reference speed VREF exceeds a threshold value. The threshold value may be any suitable value such as 60 kph, 70 kph, 80 kph or any other suitable value. When the High Speed Mode 201HS is activated, the CTIS 1 operates to increase or decrease the pressure of the front tires TFL, TFR to, for example, 2.6 bar; and the rear tires TRR, TRL to, for example, 2.8 bar. The increase or decrease in tire pressure can be performed in a single phase or multiple phases, for example to maintain the pressure differential between the front and rear tire pressures within a predefined margin.

The High Load mode 201HL can also be selectively activated by the user, or automatically by the ECU1. When the High Load Mode 201HS is activated, the CTIS 1 operates to increase or decrease the pressure of the front tires TFL, TFR to, for example, 2.6 bar; and to the rear tires TRR, TRL to, for example, 2.8 bar. The increase or decrease in tire pressure can be performed in a single phase or multiple phases, for example to maintain the pressure differential between the front and rear tire pressures within a predefined margin.

In the described embodiment, the Off Road Modes 205 need to be manually requested by the driver. When the driver requests an Off Road Mode 205, the ECU1 is programmed to deflate the tires T to the target tire pressure defined for the selected Off Road Mode 205. In the described embodiment, tire deflation from an On Road Mode 201 to an Off Road Mode 205 lasts approximately 2.5 minutes (i.e. it is comparatively slower than the tire inflation procedure). The tire deflation from an On Road Mode to an Off Road mode can be performed on all four tires T at the same time or alternatively the front tires may be deflated first and the rear tires deflated second.

Figure 3:
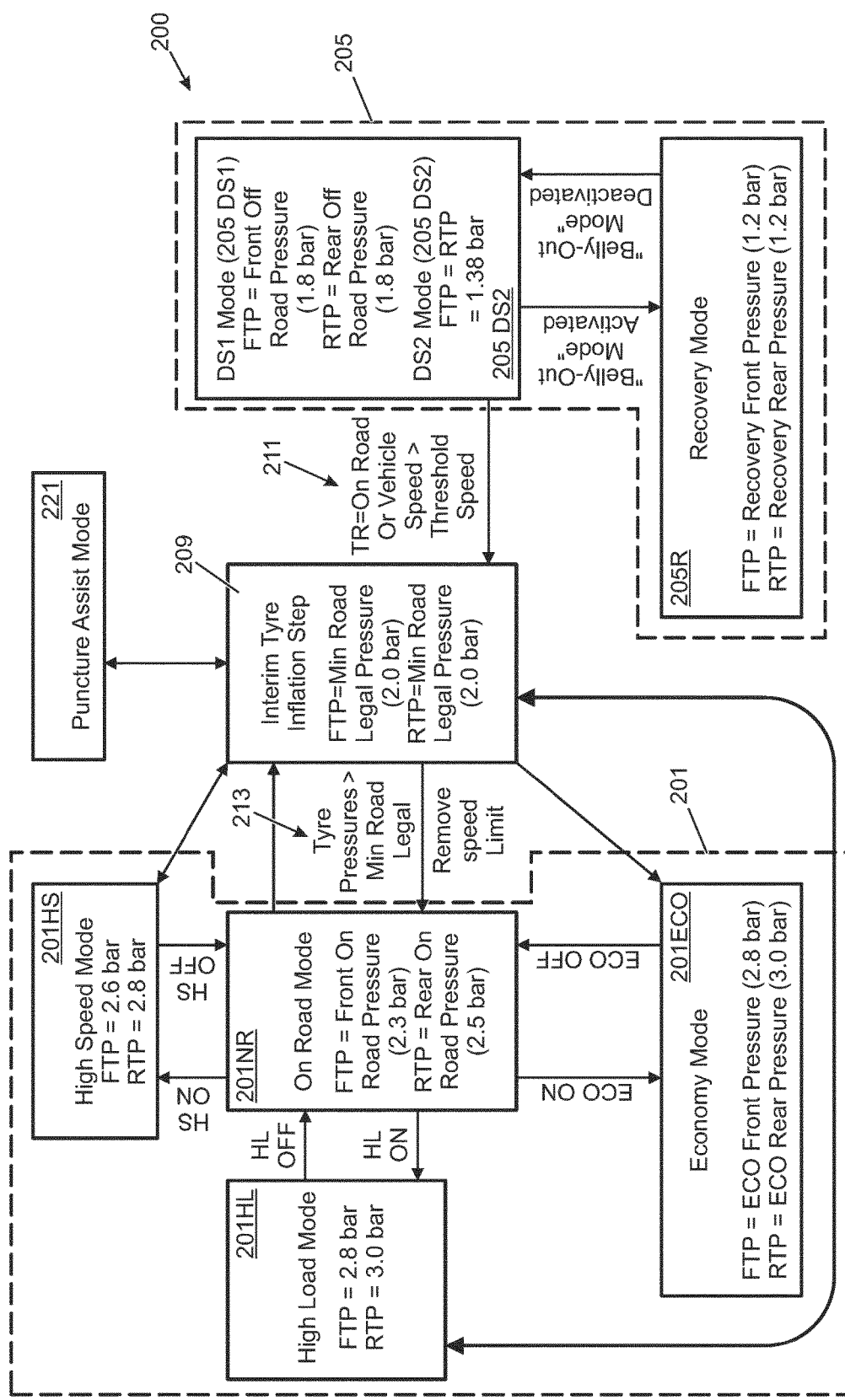
FIG. 3 is a block diagram illustrating a target tire pressure setting strategy implemented by the CTIS described herein.

As noted above, the target tire pressures that the CTIS 1 attempts to maintain are set depending on the vehicle driving mode, as illustrated in FIG. 3. The actual or current tire pressure can be measured by the pressure sensors 35A, 35B coupled to the gallery 33 disposed in the valve block 3. Alternatively and/or additionally, the actual or current tire pressure may be measured by a tire pressure monitoring system (TPMS) 43 provided on the vehicle VH (as shown in FIG. 1B). The TPMS 43 communicates wirelessly with a TPMS pressure sensor provided in each tire T. The TPMS 43 is responsible for providing the vehicle control system 9 with substantially continuous information in respect of the current tire pressures.

In the present embodiment, the gallery pressure sensors 35A, 35B are used to check the tire pressures after tire inflation and/or deflation. The gallery pressure sensors 35A, 35B have a faster registration and response time than current TPMS sensors and therefore use of the pressure sensors 35A, 35B to check pressures during and after inflation/deflation improves the accuracy and response speed of the CTIS 1.

Depending on the relationship between the target and current tire pressures, the ECU1 may be configured to implement inflation and deflation strategies to try to maintain the current tire pressure as close as possible to, or equal to, the target tire pressures.

The CTIS 1 also has a Puncture Assist Mode 221 as shown in FIG. 3. The CTIS 1 is configured to assume the Puncture Assist Mode 221 automatically if it is detected, during normal operation of the vehicle in any operating mode, e.g. not during an inflation or a deflation cycle, that pressure is reducing in one of the tires beyond normal tolerances at a rate not exceeding a predetermined 'slow pressure loss rate' (normal tolerances including pressure changes resulting from temperature changes). In the present embodiment the Puncture Assist Mode 221 is inhibited, and not assumed, if the pressure is determined to be reducing in more than one tire beyond normal tolerances although other arrangements may be useful.

In some embodiments, the CTIS 1 may also assume the Puncture Assist Mode 221 if the pressure drop in a tire T exceeds a predetermined amount.

In the present embodiment, ECU1 determines the pressure of each tire during normal operation by reference to signal 56 broadcast on the CAN bus 45 by the TPMS 43. In the present embodiment, ECU1 determines that a slow pressure loss is occurring if the pressure in a tire is more than a predetermined amount below the target pressure with a normalized flow rate in a predetermined range. In the present embodiment the predetermined amount is 0.2 bar (3 psi) and the predetermined flow rate range is from around 0.4 to around 400 mbar/hour although other values may be useful.

In these circumstances it may be determined that the tire has a non-catastrophic puncture (sometimes referred to as a slow puncture). If these conditions exist, then provided no other factors are inhibiting assumption of the Puncture Assist Mode 221, such as external vehicle functions or CTIS safety states, ECU1 causes the CTIS 1 to assume the Puncture Assist Mode 221. In the Puncture Assist Mode 221 the CTIS 1 operates to top up the tire pressure to retain it within safe operating parameters to assist the driver to return to a safe place to stop or have the tire changed. The CTIS 1 may cause a substantially continuous flow of gas to top-up the tire pressure in some embodiments. In some alternative embodiments the CTIS 1 may provide an intermittent flow. When the Puncture Assist Mode 221 is assumed, a warning is displayed to the driver recommending them to stop at a safe location and change or repair the tire.

In the present embodiment ECU1 causes the CTIS 1 to automatically increase the pressure in the tire meeting the above mentioned pressure loss and pressure loss rate conditions to a pressure that is a predetermined amount above the target tire pressure for the mode in which the vehicle was operating before the Puncture Assist Mode 221 was assumed. In the present embodiment the predetermined amount is 0.2 bar although other values may be useful in some embodiments.

In the present embodiment, ECU1 is also configured to trigger a 'deflation sub mode' of the Puncture Assist Mode 221 if the rate of pressure loss in a tire exceeds a predetermined value, in the present embodiment the preceding value being set substantially equal to the predetermined 'slow pressure loss rate' described above, which in the present embodiment is set to substantially 0.4 bar/hour. If the pressure loss exceeds 0.4 bar/hour and the pressure in the tire is less than 0.2 bar below the target pressure for the previous mode of operation. If the deflation sub mode of operation is triggered, then, as in the case of the normal Puncture Assist Mode 221, ECU1 causes the CTIS 1 to attempt to maintain the tire pressure at a pressure equal to a predetermined amount above the target pressure, in the present embodiment this predetermined amount is the same as in the normal Puncture Assist Mode 221 (0.2 bar) but it may be different in some embodiments. for example the predetermined amount may be higher in the deflation sub mode compared with the normal Puncture Assist Mode 221, having for example a value of around 0.3, 0.4 or any other suitable value.

It is to be understood that the Puncture Assist Mode 221 is automatically selected by ECU1 and is not user selectable. However, operation of the CTIS 1 in the Puncture Assist Mode 221 may be prevented by a user by selecting a 'tire pressure maintenance off' condition, in which the CTIS 1 does not attempt to maintain tire pressures at the target values for the prevailing mode of operation. Other arrangements may be useful in some embodiments.

It is to be understood that, if ECU1 determines that the leakage rate of gas from a tire exceeds a maximum CTIS-capable flow rate, ECU1 terminates inflation of the tire and closes the PCV associated with the tire in question. ECU1 causes HMI 37 to provide an indication to a user that catastrophic leakage is occurring and that operation of the vehicle should be terminated with immediate effect.

In the present embodiment, in the event that ECU1 determines by reference to TPMS signal 56 that a pressure drop has occurred in a tire meeting the requirements for operation in the Puncture Assist Mode 221 ECU1 verifies the pressure in the tire by means of the gallery pressure sensors 35A, 35B independently of the TPMS 43. ECU1 achieves this by exhausting any residual pressure in the gallery 33 to atmosphere and opening exhaust valve E1 for a sufficient period such as 1 s, 5 s or any other suitable period. ECU1 then opens the gallery outlet valve VO to the tire supply line TSL corresponding to the tire for which the pressure drop has been detected. ECU1 then causes opening of the corresponding PCV and gallery pressure sensors 35A, 35B measure the resulting pressure. Provided the gallery pressure sensors 35A, 35B also indicate a pressure drop in the tire justifying assumption of the Puncture Assist Mode 221, ECU1 causes the CTIS 1 to assume that mode 221. If the pressure values measured by the gallery pressure sensors 35A, 35B do not indicate a pressure drop justifying operation in the Puncture Assist Mode 221, ECU1 does not cause the CTIS 1 to assume the Puncture Assist Mode 221 and the Puncture Assist Mode 221 is inhibited.

The main and monitor ECUs ECU1, ECU2 are configured to receive input signals from a number of external sensors and control units external to the ECUs ECU1, ECU2 and to monitor the signals to determine whether a fault condition corresponding to one of six predetermined groups of fault conditions exists. In the present embodiment the signals are received via a controller area network (CAN) bus 45, the sensors and control units being configured to broadcast respective fault conditions over the CAN bus 45. The ECUs ECU1, ECU2 are configured to cause the CTIS 1 to assume one of six system safe states depending on the identity of any fault conditions identified by the ECUs ECU1, ECU2. The ECUs ECU1, ECU2 may be considered to be in the system fault mode 111 when the system assumes one of the six system safe states.

SSC1 (Safe State 1)

In the present embodiment the ECU1 is configured to cause the CTIS 1 to assume a system safe state SSC1 in the event that any one or more fault conditions in a first group of fault conditions are detected. If a fault condition in the first group is detected the ECU1 logs the occurrence of the fault condition in a permanent (non volatile) memory 15M thereof for later review by maintenance personnel. Operation of the CTIS 1 is otherwise unaffected by the occurrence of this fault condition.

No alert is provided to a driver of the vehicle in the event that a fault of the first group is detected, and the system exits the first system safe state SSC1 once the fault has been logged.

SSC2a (Safe State 2a)

The ECU1 is configured to cause the CTIS 1 to assume a system safe state SSC2a in the event that any one or more fault conditions in a second group of fault conditions is detected, the following fault conditions being members of the second group:
 (a) It is determined that a fault exists in respect of operation of the TPMS 43.
 (b) It is determined that a fault exists in respect of determination by the ECU1 of one or more tire pressure values output by the TPMS 43 via signal S6, S6 being read from the CAN bus 45.
 (c) A CAN bus signal is detected indicating a fault in respect of the signal S6 carried by the CAN bus.

It is to be understood that the TPMS 43 is employed by the CTIS 1 to monitor tire pressure during vehicle operations when a given operating mode has been fully assumed, between changes in operating mode of the CTIS 1, whilst the gallery 33 is isolated from the tires. During inflation and deflation processes, tire pressure is monitored by reference to the gallery pressure sensors 35A, 35B when the gallery is open to the one or more tires being inflated and the inlet valves VIN1, VIN2 are closed as described above. Accordingly, in the event that the ECU1 determines that tire pressure readings by the TPMS 43 may be inaccurate or unavailable, monitoring of tire pressure between mode changes may be suspended. In the present embodiment, the ECU1 monitors the signal S6 generated by the TPMS 43 between mode changes in order to determine whether the puncture assist mode 221 (FIG. 3) should be assumed, as described above. Accordingly, in the event that safe state SSC2a is assumed the ECU1 no longer permits the puncture assist mode 221 to be assumed. However, the ECU1 otherwise permits normal operation of the CTIS 1, including inflation and deflation steps (steps 129 and 135, respectively, of FIG. 2) in order to permit assumption of modes other than the puncture assist mode 221.

Once system safe state SSC2a has been assumed the ECU1 logs the occurrence of the fault responsible for assumption of the safe state SSC2a in the memory 15M and causes the HMI 37 to display a notification to the driver that the puncture assist mode 221 is not available. The ECU1 may also cause a message to be displayed advising the driver to check the pressure of each of the tires T of the vehicle VH.

If, during the remainder of the drivecycle, the ECU1 determines that none of fault conditions (a) to (c) exist, the ECUs ECU1, ECU2 are configured to exit safe state SSC2a and operation of the CTIS 1 continues substantially as if safe state SSC2a had not been assumed.

SSC2b (Safe State 2b)

The ECU1 is configured to cause the CTIS 1 to assume a system safe state SSC2b in the event that any one or more fault conditions in a third group of fault conditions is detected when a speed limit is not being imposed by the CTIS 1. In the present embodiment, a speed limit is only imposed when the CTIS 1 is operating in the DS1 or DS2 Off Road modes described above. If any one of these fault conditions is detected when the CTIS 1 is in the DS1 or DS2 modes the ECU1 causes the CTIS 1 to assume Safe State 3 described below.

The following fault conditions are members of the third group:

(a) The main or monitor ECUs ECU1, ECU2 detect an internal fault in respect of the determination of vehicle reference speed VREF, input thereto by means of signal S3.

(b) The main or monitor ECUs ECU1, ECU2 detect an internal fault in respect of the issue by the ECUs ECU1, ECU2 of a speed limit request to the PCM or ABS modules 71, 73.

(c) The main or monitor ECUs ECU1, ECU2 detect that the value of vehicle reference speed VREF broadcast by the ABS module 73 over the CAN bus 45 and received by the ECUs ECU1, ECU2 may be erroneous. It is to be understood that the ECUs ECU1, ECU2 may detect an erroneous signal for example in the case that the signal fluctuates or jumps in value in an unexpected manner. An erroneous signal may also be detected if the signal S3 indicates a speed value of zero when the vehicle is known to be moving. For example if the indicated speed drops from a value above zero to zero at a rate exceeding a credible value of deceleration the a determination may be made that the signal is erroneous. Furthermore the ECUs ECU1, ECU2 may be configured to detect a fail low, fail high or fail sporadic condition in respect of the value of VREF transmitted by signal S3 in some embodiments.

(d) The main or monitor ECUs ECU1, ECU2 detect that any one of the following CAN bus signals may be faulty: (i) PCM speed limit status signal S4; (ii) ABS speed limit status signal S5; and (iii) ECU1 speed limit request signal S9 to which the PCM and ABS modules 71, 73 subscribe.

(e) The main or monitor ECUs ECU1, ECU2 detect that a fault exists with the ABS module 73 in respect of the determination of VREF or in respect of limiting vehicle speed. Detection of these faults is made via receipt of CAN bus signals indicative of the fault transmitted by the ABS module 73.

(f) The main or monitor ECUs ECU1, ECU2 detect that a fault exists with the PCM module 71 in respect of limiting vehicle speed. Detection of this fault is made via receipt of a CAN bus signal indicative of the fault transmitted by the PCM module 71.

In the event that one of these fault conditions is detected, the ECUs ECU1, ECU2 are configured to allow inflation and deflation steps 129, 135 but to prevent assumption by the CTIS 1 of the Off Road modes DS1, DS2, 207. This is because the faults indicate that it may not be possible for the vehicle VH reliably to be prevented from exceeding a given speed limit, and therefore it is inadvisable not to allow operation in one of the Off Road modes DS1, DS2, 207.

Once system safe state SSC2b has been assumed the ECU1 logs the occurrence of the fault responsible for assumption of the safe state SSC3 in the memory 15M and causes the HMI 37 to display a notification to the driver that the Off Road modes DS1, DS2, 207 are unavailable. In addition or instead a cautionary tell-tale may be displayed on the HMI 37 such as an icon or lamp, optionally having a color indicative of a cautionary warning such as an amber or yellow color.

If, during the remainder of the drivecycle, the ECU1 determines that none of fault conditions of the third group exist, the ECU1 is configured to cause the CTIS 1 to exit safe state SSC2b and operation of the CTIS 1 continues substantially as if the safe state SSC2b had not been assumed.

It is to be understood that the fault conditions of the third group are fault conditions that potentially compromise the ability of the vehicle VH to prevent the speed from exceeding the relevant speed limit that is imposed when operating in one of the Off Road modes DS1, DS2. Accordingly, in safe state 2b the CTIS 1 is prevented from assuming operation in one of the Off Road modes DS1, DS2.

The ECU1 continues to determine whether a fault condition requiring operation in a system safe state exists after a given system safe state has been assumed. If the ECU ECU1 determines that no fault conditions of the third group exist whilst in system safe state SSC2b, the ECU1 is configured to cause the CTIS 1 to exit system safe state SSC2b. The driver notification displayed on the HMI 37 is therefore extinguished.

The ECU1 is configured such that, if the vehicle VH is shut down at key off with the CTIS 1 in system safe state SSC2b, the CTIS 1 resumes operation not in a system safe state (i.e. in a fully functional state with no warnings) when the vehicle VH is restarted at key on. Thus, the ECU1 is effectively reset and operation in a system safe state only recommences when a trigger condition is subsequently met.

SSC3 (Safe State 3)

The ECU1 is configured to cause the CTIS 1 to assume system safe state SSC3 in the event that a fault condition of the third group described above is met whilst a speed limit is being imposed on vehicle operations by the ECU1 or if any one or more fault conditions in a fourth group of fault conditions are detected. The following fault conditions are members of the fourth group:

(a) It is determined that an error associated with measurement of gas pressure in the gallery 33 by one of the gallery pressure sensors 35A, 35B has occurred. In the present embodiment, such an error is determined to have occurred if it is determined that one of signals P1 or P2 does not correspond to a valid pressure indication, one of the signals P1, P2 corresponds to a pressure that is outside of a predetermined expected range of signal values corresponding to the pressure of gas in the gallery 33, or the signals P1, P2 do not correlate sufficiently even if they are reading pressure values within a range of values that might be expected during operation of the CTIS 1, for example a value in the range from a value corresponding to atmospheric pressure (indicating a deflated tire) to a value corresponding to the maximum allowable pressure in the reservoir 13. In the present embodiment, the signals P1, P2 are determined not to correlate if the pressure indicated by signal P2 is not within a predetermined percentage of the pressure indicated by signal P1. In the present embodiment the predetermined percentage is 10% although other values may be useful in some embodiments.

(b) It is determined that an error associated with measurement of gas pressure in the reservoir 13 has occurred. In the present embodiment, such an error determined to have occurred if it is determined that the signal P3 generated by pressure sensor 14 does not correspond to a valid pressure indication or the signal P3 corresponds to a pressure that is outside of a predetermined expected range of signal values of pressure in the reservoir 13.

(c) It is determined that an internal fault has occurred in one or both of the ECUs ECU1, ECU2 in respect of determination of pressure in the gallery 33 or reservoir 13.

(d) It is determined that a fault has occurred in respect of a power supply providing power to the gallery pressure sensors 35A, 35B or the reservoir pressure sensor 14.

(e) It is determined that a CAN signal fault has occurred in respect of the pressure signal P1 generated by pressure sensor 35A.

(f) It is determined that a CAN signal fault has occurred in respect of the pressure signal P2 generated by pressure sensor 35B.

(g) It is determined that a fault exists with a signal broadcast on the CAN bus 45 indicative of the mode of operation of the CTIS 1 selected by a user via the HMI 37, whereby the ECU1 cannot reliably determine in which mode of operation the user requires the CTIS 1 to operate.

(h) It is determined that a fault exists with signal S1 broadcast over the CAN bus 45 indicative of the mode of operation of the CTIS 1 at a given moment in time.

(i) It is determined that a fault exists in respect of the HMI 37 such that a signal indicative of the mode of operation of the CTIS 1 the user requires the CTIS 1 to operate in may not be correctly transmitted by the HMI 37.

(j) It is determined that a wheel is fitted to the vehicle VH that is not compatible with operation of the CTIS 1, i.e. a wheel not permitting the CTIS 1 to perform the functions of tire inflation and deflation.

If the system safe state SSC3 is assumed, the ECU1 is configured to force the CTIS 1 to operate in the On Road Mode 203 if the CTIS 1 is not already operating in the On Road Mode 203, and to remain in the On Road Mode 203 until key off. Upon subsequent key on, the ECU1 does not resume operation in system safe state SSC3 unless one or more conditions noted above exist.

If any one of faults (a) to (c) has been detected, the ECUs ECU1, ECU2 terminate use of pressure signals P1, P2 in order to measure pressure in the tires and employ signal S6 generated by the TPMS 43 instead. The CTIS 1 is caused to assume the On Road mode of operation 203 and the tires are therefore inflated to a pressure of 2.3 bar in the case of the front tires TFL, TFR and 2.5 bar in the case of the rear tires TRL, TRR.

If speed limiting is currently in place due to the CTIS 1 being in one of modes DS1 and DS2, speed limiting is stopped, in the expected manner, once the On Road mode 203 has been assumed.

All operating modes other than the On Road mode 203 are suspended and each of the four pneumatic control valves PCV are placed in the closed position, corresponding to normal running. Opening of the valves PCV is not permitted. All electrical actuators associated with the CTIS 1 are prevented from operating, such as solenoid-actuated valves such as inlet valves VIN1, VIN2, VHPS, outlet valves VO and exhaust valve E1.

A notification is displayed by means of the HMI 37 that the CTIS 1 is unavailable and that tire pressures are being returned to the On Road Mode settings. The main ECU ECU1 also logs the occurrence of the one or more faults that have been detected in the permanent memory 15M.

The ECUs ECU1, ECU2 continue to determine whether a fault condition requiring operation in a system safe state exists after system safe state SSC3 has been assumed. If the ECU1 determines that no fault conditions requiring operation in state SSC3 exist whilst the CTIS 1 is in state SSC3, the ECU1 is configured to cause the CTIS 1 to exit system safe state SSC3. The driver notification displayed on the HMI 37 is therefore extinguished.

SSC4 (Safe State 4)

The ECU1 is configured to cause the CTIS 1 to assume system safe state SSC4 in the event that any one or more fault conditions in a fifth group of fault conditions is detected. The ECU1 is configured to cause the CTIS 1 to remain in safe state SSC4 until key off once state SSC4 has been assumed. Upon subsequent key on, the ECU1 does not cause the CTIS 1 to resume operation in state SSC4 unless or until one or more conditions requiring operation in that state are found exist. The following fault conditions are members of the fifth group:

(a) It is determined that an internal fault has occurred in respect of ECU1 in respect of arbitration by the ECU ECU1 between modes of operation of the CTIS 1, i.e. determination by the ECU1 which of the operating modes the CTIS 1 should assume at a given moment in time.

(b) It is determined that a fault exists with the ECU1 in respect of control of the inflation or deflation of one or more tires, i.e. the ECU1 determines that unintended inflation or deflation of a tire is occurring.

(c) It is determined that a fault exists in respect of output by the ECU1 of a pulse width modulation (PWM) power signal to actuate inlet valves VIN1, VIN2.

(d) It is determined that a fault exists in respect of one or both of inlet valves VIN1, VIN2 themselves.

(e) It is determined that a CAN bus signal fault exists in respect of communication over the CAN bus 45 of signal S2 indicating actual and target tire pressure values from the ECU1 to the monitor ECU ECU2. The existence of this fault is determined in the present embodiment by reference to a CAN bus signal that specifically highlights when a fault exists in respect of a given signal.

(f) It is determined that a fault exists in respect of an air line carrying compressed air from compressor 9 via dryer 29 to valve block inlet valves VIN1, VIN2.

The following conditions also trigger the ECU1 to cause the CTIS 1 to assume system safe state SSC4, provided sufficient reserve air pressure is present in the reservoir 13 to place each of the four pneumatic control valves PCV in the closed position, corresponding to normal vehicle running:

(g) It is determined that a fault exists in respect of output by the ECU1 of a control signal to actuate one or both of motor control relays 27_1, 27_2 that control the motor 27 that drives the compressor 9.

(h) It is determined that a fault exists in respect of output by the ECU1 of a control signal to control supply of power to a heater of dryer unit 29 or supply of power to a solenoid of purge valve 29V.

(i) It is determined that a fault exists in respect of output of a PWM power signal by the ECU1 to actuate reservoir supply valve VRES.

(j) It is determined that a fault exists in respect of one or both of motor 27 and compressor 9.

(k) It is determined that a fault exists in respect of the dryer 29 itself.

(l) It is determined that a fault exists in respect of the power supply relay 49 itself.

(m) It is determined that a fault exists in respect of reservoir supply valve VRES such as a fault in respect of a solenoid actuator of the valve VRES.

(n) It is determined that a fault exists in respect of a supply of power to the motor 27 that drives the compressor 9.

If system safe state SSC4 is triggered, the ECU1 prevents operation of the CTIS 1 for the remainder of the drive cycle. Any inflation or deflation routines that may be in progress are terminated.

All air transmission paths associated with the CTIS 1 are isolated by closing all valves associated with the CTIS 1. This is accomplished by terminating supply of power to all electrical actuators including all solenoid controlled actuators associated with the CTIS 1 (such as those associated with valves other than the four pneumatic control valves PCV), causing the valves to assume a closed condition. It is to be understood that all of the valves other than the four pneumatic control valves PCV are of the normally-closed type. Termination of the supply of electrical power to the solenoids of the valves therefore causes the valves to assume a closed condition. Each of the four pneumatic control valves PCV is also placed in the closed position, corresponding to normal running, and reopening of the control valves PCV is not permitted. All operating modes of the CTIS 1 are then suspended for the remainder of the current drive cycle.

If the vehicle is currently subject to a speed limitation imposed by the CTIS 1, for example due to operation in the DS1, DS2 or Recovery modes, the main ECU ECU1 continues to impose the speed limit unless the TPMS tire pressure signal S6 indicates that all of the tire pressures are above a threshold tire pressure which in the present embodiment corresponds to the intermediate target tire pressure described above in respect of the interim tire inflation mode 209. The intermediate target tire pressure is set to 2.0 bar in the present embodiment in order to satisfy a local legal requirement minimum road legal pressure however other values may be useful in some embodiments. In some embodiments the speed limit is imposed unless the TPMS tire pressure signal S6 indicates that the tire pressures are at or above the pressures required for the Normal Run Mode 201NR.

A notification is displayed by means of the HMI 37 that the CTIS 1 is unavailable and that tire pressures are remaining at their current settings. A warning may also be issued to recommend that the driver should manually check the tire pressures and modify them if necessary. If a speed limit is being imposed on the vehicle due to operation in the DS1, DS2 or Recovery modes the HMI 37 also provides an indication that the speed limit will be imposed until manual inflation of the tires to at least the intermediate tire pressure value is made (or Normal Run Mode 201NR tire pressure values in some embodiments). The notification via the HMI 37 may include the display of a cautionary tell-tale, in the present embodiment an illuminated red lamp or region of the HMI 37 indicating the relatively severe limitation that has been imposed on the capabilities of the CTIS 1. The ECU1 also logs the occurrence of the one or more faults detected in the permanent memory 15M.

The CTIS 1 remains in system safe state 4 throughout the remainder of the drive cycle unless a transition to safe state 5 (described below) is imposed.

SSC5 (Safe State 5)

The monitor ECU ECU2 is configured to cause the CTIS 1 to assume system safe state SSC5 in the event that (i) there is an insufficient reserve air pressure in the reservoir 13 to place each of the four pneumatic control valves PCV in the closed position corresponding to normal vehicle running and one or more of conditions (g) to (n) is met in respect of safe state SSC4 described above; or (ii) any one or more fault conditions in a sixth group of fault conditions is detected by the monitor ECU ECU2. The following fault conditions are members of the sixth group:

(a) It is determined that a fault exists in respect of output by the monitor ECU ECU2 of signal S12 to control power supply relay 49.

(b) The ECU1 experiences a fault in respect of output by the ECU1 of a PWM signal to control high pressure supply valve VHPS.

(c) The ECU1 experiences a fault in respect of output by the ECU1 of a PWM signal to control exhaust valve E1.

(d) The main ECU ECU1 experiences a fault in respect of output by the main ECU ECU1 of a PWM signal to control a solenoid actuator of any of the four gallery outlet valves VO (e) A fault is detected in respect of high pressure supply valve VHPS including a fault in respect of the solenoid responsible for actuation of the valve.

(f) A fault is detected in respect of exhaust valve E1 including a fault in respect of the solenoid responsible for actuation of the valve.

(g) A fault is detected in respect of one or more of the outlet valves VO including a fault in respect of the corresponding solenoid responsible for actuation of a given outlet valve VO.

(h) A fault is detected in respect of operation of air reservoir 13.

(i) A fault is detected in respect of operation of a rotary air coupling RAC.

(j) A fault is detected in respect of operation of a pneumatic control valve PCV.

(k) A fault is detected in respect of an airline from the valve block 3 to a road wheel.

(l) A fault is detected in respect of operation of an airline from the valve block 3 to the reservoir 13.

(m) A fault is detected in respect of operation of an airline from the reservoir 13 to the valve block 3.

If the monitor ECU ECU2 determines that system safe state SSC5 should be assumed, the monitor ECU ECU2 causes, via signal S12, power supply relay 49 to terminate supply of power to the ECU1. Since the ECU1 is responsible for supplying power to control the electrically actuated valves of the CTIS 1 via signals S11, termination of the supply of power to the ECU1 has the effect of terminating the supply of power to all electrically actuated valves of the CTIS 1 including the inlet valves VIN1, VIN2, high pressure inlet valve VHPS, outlet valves VO and exhaust valve E1, causing them to close. This in turn causes isolation of air lines of the CTIS 1. Any inflation or deflation steps that are in progress at the time system safe state SSC5 is assumed are therefore immediately terminated and all operating modes of the CTIS 1 are suspended. The monitor ECU ECU2 logs the occurrence of the fault in a non-volatile memory 25M thereof.

If the vehicle is subject to a speed limitation by the CTIS 1 at the time system safe state SSC5 is assumed, the monitor ECU ECU2 continues to impose the speed limit on vehicle operations unless the monitor ECU ECU2 determines, by reference to signal S6 output to the CAN bus 45 by the TPMS 43, that the pressure of air in each of the tires exceeds the corresponding intermediate target tire pressure value described above.

In addition, the monitor ECU ECU2 is configured to resume operation in system safe state SSC5 in subsequent drivecycles, i.e. at key on following key off, until a predetermined reset operation is performed. In the present embodiment the VH is configured such that the reset operation requires connection of the monitor ECU ECU2 to a computing system, typically via the CAN bus 45, the computing system being configured to provide a control signal to the monitor ECU ECU2 to cause the monitor ECU ECU2 to exit the system safe state SSC5 at the next key on, restoring power to the ECU1.

When the monitor ECU ECU2 determines that system safe state SSC5 should be assumed, the monitor ECU ECU2 causes a notification to be displayed by means of the HMI 37 to inform a driver that a CTIS fault has been detected, that tire pressures should be checked and adjusted if necessary, and that the CTIS is no longer available for service. If a speed limit is being imposed on vehicle operation by the CTIS 1 a corresponding notification is also provided to the driver. An audible alert may be provided to the driver in addition to the visual alert by means of the HMI 37. The driver is also informed that assistance should be sought from an authorized service agent or like service provider in order to restore CTIS operation. A warning tell-tale may be displayed such as a colored lamp, optionally a red lamp indication.

It is to be understood that the present description of the operation of the vehicle VH of the illustrated embodiment is provided by way of non-limiting example only. In some alternative embodiments, an ECU or vehicle VH may be configured to assume one of a smaller or a greater number of system safe states in dependence on the occurrence of one or more predetermined fault conditions. The fault conditions triggering a given system safe state in one embodiment may be different to those triggering a given system safe state in another embodiment. Similarly, operation of a vehicle VH in a given system safe state may be different in some embodiments to operation of the vehicle VH in a similar system safe state in another embodiment.

As noted above, in some embodiments the ECU1 may be configured when operating the CTIS 1 in the Off Road Mode 205 to transition to the On Road Mode 203 when the value of the vehicle reference speed parameter VREF exceeds a threshold value VTHR. When the ECU1 causes the CTIS 1 to transition to the On Road Mode from the Off Road Mode, the ECU1 displays a warning to the user via the HMI 37 until the On Road Mode tire pressure values have been attained.

When the ECU1 is causing the CTIS 1 to operate in the High Speed Mode 201HS, the ECU1 is configured to cause the CTIS 1 to operate in the On Road Mode 203 if a user selects the On Road Mode via the HMI 37. The ECU1 is also configured to cause the CTIS 1 to operate in the On Road Mode if the user switches the CTIS 1 off whilst in the High Speed Mode. In the present embodiment, the CTIS 1 is configured to permit tire pressure maintenance to be switched off, in which case the CTIS 1 no longer adjusts tire pressures when in a given operating mode to maintain the pressures at the target values for the selected operating mode.

System Checks

In the present embodiment the ECU1 is configured to control the CTIS 1 to perform a set of initial system checks when the vehicle VH is started, i.e. when the vehicle assumes power mode PM7 from another power mode.

The first system check is a gallery pressure sensor check. In performing the check the ECU1 causes the exhaust valve E1 to be opened whilst the remaining inlet and outlet valves of the gallery 33 remain closed. Provided the CTIS 1 is operating correctly, the pressure of gas in the gallery 33 should become substantially equal to atmospheric pressure. The ECU1 then checks the values of signals P1 and P2 generated by the gallery pressure sensors 35A, 35B against a predetermined datum pressure value stored in a memory of the ECU1 corresponding substantially to atmospheric pressure in the present embodiment. If the values of signals P1, P2 do not correspond substantially to the datum values ECU1 determines that the CTIS 1 has failed the system check and operation of the CTIS 1 is not permitted. In the present embodiment signals P1, P2 are considered to correspond substantially to the datum value if each indicates a pressure that is within a predetermined amount of the datum pressure value. In the present embodiment the predetermined amount is substantially 5% although other values may be useful in some embodiments. In some embodiments ECU1 determines the signals P1, P2 correspond substantially to the datum value if each indicates a pressure that is in the range from around 930-1080 mbar, being the maximum expected range of atmospheric pressure, and that the values are within 5% of one another.

If the CTIS 1 passes the gallery pressure sensor check, ECU1 closes the exhaust valve E1 and proceeds to perform a PCV valve check.

The PCV check requires ECU1 to open each of the gallery outlet valves VO and verify that signals P1, P2 remain substantially equal to the datum value. If the pressure of gas in any of the tire supply lines TSL is above atmospheric pressure due to an open or leaking PCV, the pressure of gas in the gallery 33 will increase. If ECU1 determines that the pressure of gas in the gallery 33 has increased by more than a predetermined amount, ECU1 determines that the CTIS 1 has failed the PCV check.

If the CTIS 1 has passed the PCV check, ECU1 proceeds to perform a VHPS valve check in which ECU1 checks correct operation of the high pressure supply valve VHPS and reservoir pressure sensor 14. ECU1 achieves this by first opening and closing the gallery exhaust valve E1. In some embodiments the exhaust valve E1 is only opened and closed if a pressure rise exceeding a predetermined amount was observed during the PCV check.

ECU1 then causes supply valve VHPS to open, causing gas to flow from the reservoir 13 into the gallery 33. ECU1 then checks the pressure signals P1, P2 and P3 to verify that any difference in pressure between the gallery 33 and reservoir 13 indicated by signals P1 and P3, and P2 and P3, is less than a predetermined amount. ECU1 then closes the supply valve VHPS. It is to be understood that, provided any difference in pressure indicated by signals P1 and P3, and P2 and P3, is less than a predetermined amount ECU1 determines that the CTIS 1 has passed the VHPS check.

ECU1 then performs a tire supply line (TSL) check. This is accomplished by opening the gallery outlet valves VO (with valve VH PS closed) to allow pressurized gas in the gallery 33 from the reservoir 13 to flow into the tire supply lines TSL. ECU1 monitors a drop in pressure of gas in the gallery 33, by reference to signals P1, P2. After a predetermined time period has elapsed, sufficient to cause equilibration of pressure between the gallery 33 and tire supply lines TSL, typically around 1-3 s, ECU1 causes the gallery outlet valves VO to close and exhausts gas remaining in the gallery 33 to atmosphere via gallery exhaust valve E1. Pressurized gas remains trapped in the tire supply lines TSL. Upon closing the exhaust valve E1 the main ECU ECU1 then causes the outlet valves VO to open, in turn, and monitors any increase in pressure in the gallery 33 via signals P1, P2. ECU1 verifies that the pressure of gas in the gallery 33 increases by at least a predetermined amount after each of the four outlet valves VO is opened, due to the presence of pressurized gas trapped in the tire supply lines TSL. It is to be understood that, by means of the TSL check, the main ECU ECU1 is able to verify that (a) the tire supply lines TSL are not suffering excessive leakage and (b) the outlet valves are exhibiting correct operation.

The main ECU ECU1 then performs a reservoir supply valve VRES check in which the ECU ECU1 causes opening of supply valve VRES and one of gallery inlet valves VIN1, VIN2. In the present embodiment the first gallery inlet valve VIN1 is opened. ECU1 then checks that P1 and P3 read substantially the same pressure value (to within a predetermined amount), and P2 and P3 read substantially the same pressure value (to within a predetermined amount), in a similar manner to that when conducting the VHPS check. Provided these conditions are met the ECU1 closes valve VRES and opens gallery exhaust valve E1 in order to exhaust gas in the gallery 33 to atmosphere and reduce the pressure in the gallery 33 substantially to atmospheric pressure. The ECU1 then repeats the process of opening supply valve VRES and the other of valves VIN1, VIN2, being the second inlet valve VIN2 in the present embodiment. The ECU1 then checks again that P1 and P3 read substantially the same pressure value (to within a predetermined amount), and P2 and P3 read substantially the same pressure value (to within a predetermined amount). Provided these conditions are met the ECU1 closes valve VRES and opens gallery exhaust valve E1 to exhaust gas in the gallery 33 to atmosphere and reduce the pressure in the gallery 33 back substantially to atmospheric pressure.

It is to be understood that the reservoir supply valve VRES check verifies correct operation of the reservoir supply valve VRES, reservoir pressure sensor 13, inlet valves VIN1, VIN2 and gallery exhaust valve E1. It is to be understood that in checking correct operation of the exhaust valve E1 the ECU1 is also checking that a gas flow path from the exhaust valve to atmosphere is not blocked.

Following the system checks, the ECU1 causes each of the valves that has been tested to assume a closed condition if they were not already in such a condition.

It is to be understood that the order in which certain of the checks are performed may be different in some embodiments.

If any of the system checks has not been passed, ECU1 causes a notification to be displayed to a driver via the HMI 37. In the present embodiment the HMI 37 provides the notification via a visual output, for example by not illuminating or highlighting a CTIS icon, or displaying the icon in a predetermined color or tone such as grey as opposed to black and white or another color. In some embodiments an audible indication may be provided.

Driver Confirmation

In the present embodiment, the driver is able to select a desired CTIS operating mode by means of the HMI 37. In the present embodiment the HMI 37 comprises a touch screen display accessible to a driver whilst driving. The driver is able to select any available mode by reference to the HMI 37, which communicates driver mode selection to the ECU1. In the present embodiment the HMI 37 does not permit a driver to select a CTIS operating mode that is not available at the time.

If all CTIS 1 operating modes are available, the HMI 37 displays the current mode in which the CTIS 1 is operating and a list of other available modes. The HMI 37 requests a user to select the desired mode by touching the region of the touch-screen in which the desired mode is displayed. By way of example, if the CTIS 1 is operating in the normal-run mode, the HMI 37 may display the following:

"CURRENT MODE: NORMAL-RUN

Normal-run

Economy

High Speed

High Load

Off Road 1

Off Road 2

Recovery"

Upon receipt of a signal indicating that the driver wishes to change the CTIS operating mode, ECU1 causes the HMI 37 to display a message indicating the identity of the mode requested by the driver, and asks the driver to confirm that the mode they have selected is the mode they wish the CTIS 1 to assume. ECU1 causes the HMI 37 to display a button on the touch-screen for the driver to touch to confirm that the indicated mode is correct. In the present embodiment the button is displayed until the driver touches the button, but is erased after a predetermined time period has expired. In the present embodiment the predetermined time period is 3 s although other values such as 2 s, 5 s or any other suitable value may be useful in some embodiments. If the button is erased before the driver touches it, ECU1 causes the CTIS 1 to remain in the current operating mode and not to change to the selected mode. If the driver still wishes to assume a different mode the driver must reselect the mode, and confirm the mode change within 3 s by touching the button displayed. In some embodiments a user is only required to confirm selection of a new operating mode when a new mode is selected if the new mode is an off road mode, regardless of the present operating mode. In some embodiments, a user is only required to confirm selection of a new mode if an off road mode 205 is selected whilst the vehicle is operating in an on-road mode 201.

In the present embodiment the HMI 37 displays the following text when a different mode is selected, in the present example the economy mode:

"Economy mode selected: press to confirm selection"

It is to be understood that the feature that ECU1 verifies driver selection has the advantage that if a driver inadvertently selects a different mode, or inadvertently selects a mode other than the desired mode, the driver is able conveniently to prevent the CTIS 1 from causing the change in mode by ignoring the request to confirm. It is to be understood that inadvertent selection of an on-road mode such as normal run mode 201NR when driving off-road may be inappropriate and result in increased difficulty traversing a terrain.

In some embodiments the HMI 37 also displays a button the touching of which causes the HMI 37 to cancel the request to the driver to confirm the selection, and cancel the change in operating mode. The CTIS 1 therefore continues operating in its current mode and the driver is invited again to make a selection from the list of available operating modes.

In some embodiments, if the driver selects an off-road mode whilst operating in an on-road mode, the HMI 37 provides one or more warnings to the driver. For example, the HMI 37 may provide one or more indications such as (a) they should drive carefully, (b) they should avoid sharp turns and (c) they should avoid heavy braking. The HMI 37 may require that the driver confirm they have read the indications by pressing a button before ECU1 permits a change in operating mode.

The HMI 37 may display an indication to the driver that one or more constraints have been placed on vehicle operation when operating in certain CTIS operating modes. For example, when operating in an off-road mode the HMI 37 may provide a message indicating that vehicle speed has been limited to the predetermined speed limit value, for example:

"caution: vehicle speed limited to 80 kph"

In some embodiments, a speedometer of the vehicle having a vehicle speed scale and indicator for indicating actual speed against the scale, such as a needle, may cause a portion of the scale corresponding to an available speed range to be illuminated or otherwise highlighted in contrast to speeds above the available range.

EPAS and ABS

The vehicle has an electric power-assisted steering (EPAS) system controlled by an EPAS module 81. The EPAS module 81 controls an electrical steering assist actuator 83 that applies torque to a steering rack of the vehicle VH when a user turns a steering wheel 80 of the vehicle in order to reduce the amount of torque that a user is required to apply to the steering wheel 80 of the vehicle VH in order to turn the wheel 80 at a given moment in time.

The EPAS module 81 is configured to receive a signal from ECU1 via the CAN bus 45 indicative of the pressure of the tires of the vehicle VH. The EPAS module 81 determines the amount of assistance provided by the actuator 83 at a given moment in time in dependence on vehicle speed, by reference at least in part to vehicle reference speed signal VREF and the pressure of the tires of the vehicle VH, optionally via a look-up table. It is to be understood that, the lower the tire pressures, the greater the amount of assistance the EPAS module 81 causes to be provided, at a given moment in time. In some embodiments the EPAS module 81 receives a signal indicative of the operating mode of the CTIS 1 instead, being a signal indicative of tire pressure, and determines the amount of assistance to be provided in dependence on the operating mode, optionally via a look-up table.

The ABS module 73 is also configured to receive a signal from ECU1 via the CAN bus 45 indicative of the pressure of the tires of the vehicle VH. It is to be understood that the ABS module 73 controls a number of active safety features of the vehicle VH that employ braking when required to enhance vehicle safety. The performance of these safety features can be affected by tire pressure. Accordingly, in the present embodiment the ABS module 73 is configured to tune the control of these safety features according to tire pressure.

The active safety features employing braking in the present embodiment are:

(a) anti-lock braking;
(b) dynamic stability control (DSC) system
(c) roll stability control (RSC) system
(d) trailer anti-sway system In the present embodiment, the ABS module 73 tunes the anti-lock braking feature by adjusting the threshold values of wheel slip in dependence on tire pressure. It is to be understood that lower tire pressures result in a larger contact patch between the tire and driving surface, and therefore enhanced tractive capability. Accordingly, in the present embodiment, the ABS module 73 reduces the threshold values of wheel slip that trigger the anti-lock braking feature. Anti-lock braking systems are well known and will not be described in detail herein. However, it is to be understood that the ABS module 73 is configured to reduce the amount of brake force or torque applied to one or more wheels when the amount of slip exhibited by the wheel exceeds a predetermined amount. In some embodiments the ABS module 73 reduces the amount of brake force or torque applied to wheels of an axle when the amount of slip exhibited by a wheel of that axle exceeds a predetermined amount.

DSC functionality implemented by ABS systems is well known and will also not be described in detail herein. However it is to be understood that the ABS module 73 is configured to implement DSC functionality by torque vectoring in order to attempt to maintain the vehicle yaw rate substantially equal to a target yaw rate based at least in part on steering wheel angle. The ABS module 73 implements torque vectoring by applying brake force to one or more wheels to initiate understeer in the case the vehicle experiences excessive oversteer, and to initiate oversteer in the case the vehicle experiences excessive understeer.

It is to be understood that, the lower the pressure of tires in a vehicle, the more the vehicle is likely to roll when cornering due to flexing or folding of the tires, but the greater the potential tractive force between a wheel and ground for a given driving surface. Accordingly, the ABS module 73 is configured to apply brake force to one or more wheels to correct yaw rate error when the yaw rate error exceeds a threshold value that reduces with decreasing tire pressure. Accordingly, the ABS module 73 causes the DSC functionality to be of greater sensitivity to yaw rate error as tire pressure decreases.

RSC functionality is also well known and will not be described in detail herein. However it is to be understood that the ABS module 73 is configured to implement RSC functionality by torque vectoring in order to attempt to prevent excessive roll of the vehicle VH. The ABS module 73 implements torque vectoring for the RSC functionality in a similar manner to the DSC functionality, by applying brake force to one or more wheels to initiate oversteer in the case the vehicle experiences excessive roll. That is, if the roll angle exceeds a predetermined value due to cornering, the ABS module 73 applies brake force to one or more wheels acting to cause yaw in an opposite direction to the direction of turn, to reduce the roll angle. The ABS module 73 is configured to reduce the critical value of roll angle, for a given steering angle and vehicle speed, as tire pressure reduces.

In some embodiments the ABS module 73 may be configured to implement an anti-away functionality when the vehicle VH is towing. The anti-away functionality is implemented by torque vectoring, typically by means of braking, in order to reduce sway as the vehicle is moving, whether in a straight line or during cornering. Again, anti-away functionality is well known and will not be described in detail herein. The ABS module 73 is configured to set the threshold value of yaw rate error that trigger anti-sway functionality in dependence on vehicle tire pressures. In some embodiments the threshold values are arranged to decrease with decreasing tire pressures due to the increased tendency of the vehicle to sway due to folding of tires as tire pressure reduces.

As noted above, the ABS module 73 and EPAS module 81 are configured to monitor signals broadcast on the CAN bus 45. In the event that ECU1 broadcasts a signal indicative that the value of one or more tire pressures broadcast on the CAN bus 45 are unreliable, the ABS module 73 and EPAS module 81 are configured to employ a default set of tire pressures for aspects of their operation requiring a knowledge of tire pressure. In the present embodiment, the ABS module 73 and EPAS module 81 are configured to assume that the tire pressures are those normally assumed when the CTIS 1 is in the normal run mode 201NR, which in the present embodiment corresponds to a pressure of substantially 2.3 bar for the front tires and 2.5 bar for the rear tires. It is to be understood that, in the event of a fault associated with the CTIS 1, it may be expected that a driver will endeavor to drive the vehicle VH to a service or repair facility, requiring on-road driving, and that therefore the driver is likely to operate the vehicle VH with tire pressures suitable for on-road driving. Operation of the ABS module 73 and EPAS module 81 using tire pressures corresponding substantially to the normal run mode 201NR is therefore likely to provide acceptable performance of those systems under these circumstances.

Some embodiments of the present invention have the advantage that vehicle systems such as those controlled by the ABS module 73 and/or EPAS module 81 may be configured to adapt their operation to the prevailing tire pressures in order to enhance vehicle performance and/or composure. Furthermore, in the event of a fault in respect of tire pressure values broadcast on the CAN bus 45, the vehicle systems employ default values of tire pressures that are most likely to provide acceptable performance of those systems.

Tire Life Counter

It is to be understood that operation of vehicles at lower tire pressures than those used for on-road driving, such as at tire pressures suitable for off-road driving on relatively slippery terrain, can result in accelerated tire wear. This may be at least in part due to increased flexure of sidewalls of a tire due to the reduced pressure. The enhanced traction due to increased contact area between tire and driving surface is nevertheless advantageous for off-road driving in a number of scenarios including wet grass and sand.

In order to reduce problems associated with increased tire wear due to operation at reduced tire pressures, some embodiments of the present invention are configured to monitor tire use and to predict when a tire is approaching or has reached an end of useful life.

Figure 4:
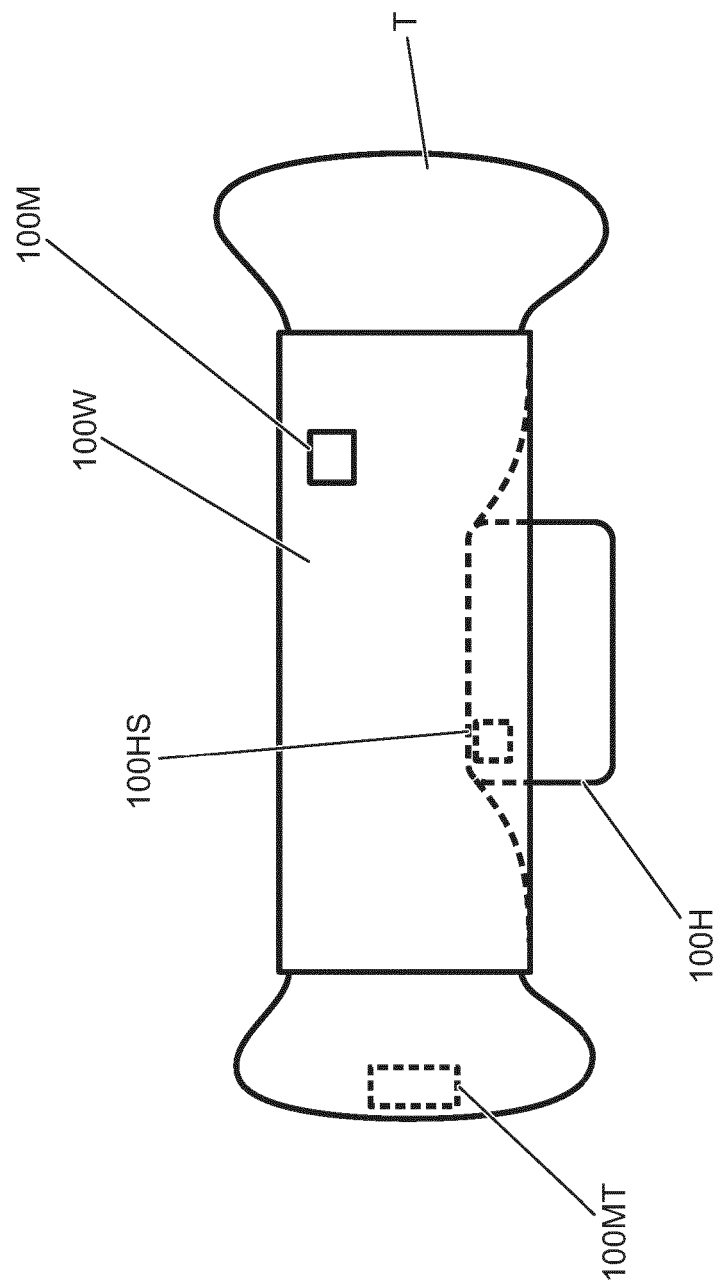
FIG. 4 is a cross-sectional schematic illustration of a wheel of a vehicle according to an embodiment of the present invention.

In the present embodiment ECU1 is configured to implement a tire life counter function in which ECU1 increments a counter at a rate that is dependent on the following vehicle parameters:

(a) tire pressure
(b) tire temperature
(c) vehicle speed
(d) lateral tire loading
(e) longitudinal tire loading Vehicle tire pressure and tire temperature are determined by reference to signal 56 published on the CAN bus 45 by the TPMS 43. In the present embodiment, the TPMS 43 determines tire pressure and temperature of each wheel by reference to wireless signals transmitted by tire pressure monitoring devices 100M attached to each wheel rim 100W of the vehicle VH as shown in FIG. 4. The devices 100M transmit a unique identification code along with their respective temperature and pressure signals. The TPMS 43 is able to determine the location of each device 100M by reference to the identity of the antenna receiving the signal from the respective device 100M, or the antenna receiving the strongest signal from the respective device 100M. The TPMS 43 then broadcasts the pressure and temperature of each tire, with an indicator of the location of the tire (e.g. front left, front right etc.), on the vehicle CAN bus 45.

Vehicle speed is determined by ECU1 be reference to vehicle reference speed signal VREF.

Lateral tire loading is determined by reference to a lateral acceleration signal generated by the ABS module 73 whilst longitudinal tire loading is generated by reference to a longitudinal acceleration signal also generated by the ABS module 73. It is to be understood that one or more other modules may generate the lateral acceleration signal and/or longitudinal acceleration signal in some embodiments.

In some embodiments, the tire life counter function may take ambient temperature into account. Ambient temperature may be determined by reference to an ambient temperature signal 79TS generated by the BCM 79 by reference to an ambient temperature sensor 79T. Although in the present embodiment the BCM 79 generates the ambient temperature signal 79TS, in some embodiments other control modules may generate the temperature signal 79TS.

ECU1 is configured to monitor each of parameters (a) to (e). Each time the value of a parameter falls meets a timer change condition, for example by falling below a predetermined threshold value or exceeding a predetermined threshold value, depending on the parameter, the ECU1 causes a timer to begin changing at a predetermined rate, to indicate an increase in an amount of wear that has been suffered by a tire. If more than one parameter meets the timer change condition the ECU1 may cause the time to change at a higher rate. In the present embodiment the timer is arranged to increase in value with increasing wear but in some alternative embodiments the timer may be arranged to decrease in value with increasing wear.

In the present embodiment, if tire pressure falls below a predetermined tire pressure value pressure_threshold, the ECU1 increments the value of tire_life_counter by a predetermined amount, tire_pressure_increment, for each 100 ms for which the value of tire pressure value is below the value of pressure_threshold. In the present embodiment the value of pressure_threshold is around 2 bar although other values may be useful. Other periods of time between increments of tire_life_counter may be useful in some embodiments such as 10 ms, 500 ms, 1s or any other suitable value provided it results in the value of tire_life_counter being incremented at a sufficiently high rate. It is to be understood that in the present embodiment ECU1 also increments the value of tire_life_counter even when the vehicle is shut down and stationary, e.g. in power mode PM0 corresponding to a parked, locked and unattended vehicle, in order to account for tire degradation even when the vehicle VH is substantially stationary. In some embodiments the value of tire_life_counter is not changed when the vehicle is stationary.

If the value of tire temperature rises above a predetermined value temperature_threshold, in the present embodiment a value of 40 C, ECU1 increments the value of tire_life_counter by a predetermined amount, tire_temperature_increment, for each 100 ms for which the value of tire temperature value is above the value of temperature_threshold. In some embodiments the value of tire_pressure_increment may be set in dependence on the tire temperature, being higher at higher temperatures to reflect an increased rate of tire degradation, such as drying and embrittlement, at higher temperatures. Similar, the rate may increase with decreasing temperature below a predetermined value, such as below 0 C, −10 C or any other suitable value. This is so as to reflect possible increased degradation of the tire at relative harsh, low temperatures. The ECU1 may be configured to increase the rate at which the value of tire_life_counter changes so that it changes at a higher rate for a given distance traveled or time spent at a given speed at tire temperatures below a given temperature threshold compared with a tire temperature just above the threshold, reflecting an increased rate of wear when the vehicle is operated at relatively low tire temperatures. Similarly, the ECU1 may be configured to increase the rate at which the value of tire_life_counter changes so that it changes at a higher rate for a given distance traveled or time spent at a given speed at tire temperatures above a given temperature threshold compared with a temperature just below the threshold, reflecting an increased rate of wear when the vehicle is operated at relatively high tire temperatures.

ECU1 may be configured such the value of tire_life_counter is changed so as to indicate increased tire wear each time a predetermined period elapses, such as every 100 ms, by an amount that is directly proportional to vehicle speed. For example the value of tire_life_counter may be incremented by an amount substantially equal to speed x speed_increment where the value of speed_increment is substantially constant. In some embodiments the value of speed_increment may be dependent on one or more parameters such as vehicle speed itself, tire pressure, and/or one or more other parameters. the value of speed_increment may be dependent on vehicle speed itself so as to reflect an increased rate of tire degradation at certain speeds, such as speeds exceeding 20 kph, 30 kph or ay other suitable value.

ECU1 may be configured to increment the value of tire_life_counter by a predetermined amount, tire_lateral_increment, for each 100 ms for which the value of lateral acceleration of the vehicle is above a threshold value lateral_threshold. Similarly, ECU1 may be configured to increment the value of tire_life_counter by a predetermined amount, tire_longitudinal_increment, for each 100 ms for which the value of longitudinal acceleration of the vehicle is above a threshold value longitudinal_threshold. Thus, ECU1 takes into account lateral tire loading and longitudinal tire loading on tire wear/degradation. In some embodiments the value of one or both of tire_lateral_increment and tire_longitudinal_increment may be arranged to be determined in dependence at least in part on vehicle lateral acceleration and vehicle longitudinal acceleration, respectively. Other arrangements may be useful in some embodiments.

In some alternative embodiments, ECU1 is configured to monitor each of parameters (a) to (e) and to calculate, each time a predetermined time period elapses since the previous time period elapsed, the average value of each of these parameters over that time period. ECU1 sets a variable equal to the average value of each parameter at the end of each time period:

A=average value of tire pressure
B=average value of tire temperature
C=average value of vehicle speed
D=average value of lateral tire loading
E=average value of longitudinal tire loading For example in some embodiments the predetermined time period is substantially 1 s. Therefore, at 1s intervals when the vehicle is in a given condition, such as a power mode corresponding to vehicle driving (in the present embodiment power mode PM7), ECU1 calculates the average value of each of parameters (a) to (e), i.e. parameters A to E, over the preceding 1s interval. ECU1 feeds the average value of each parameter into an algorithm to calculate an increment value increment_value. The increment value is then added to a tire life counter parameter tire_life_counter.

In the present embodiment the tire life counter algorithm is as follows:

$$\text{increment\_value} = X1/A + X2 \cdot B + X3 \cdot C + X4 \cdot D + X5 \cdot E$$

where X1, X2, X3, X4 and X5 are weighting factors for parameters A to E respectively. In the present embodiment the weighting factors are constant and not changed. In some alternative embodiments one or more of the weighting factors may be adjusted in dependence on one or more parameters.

ECU1 stores in memory 15M maximum allowable values of tire_life_counter for each of a predetermined number of known tire types (according to manufacturer and product serial number) that have been approved for use with the CTIS 1. When a new tire is fitted to the vehicle VH, a user (or authorized service personnel) may select, from the predetermined stored tire types, the tire type that has been fitted to the vehicle. The selection may be made via HMI 37 or by means of an external device in communication with ECU1 directly or indirectly, and cause the tire life counter value tire_life_counter to be reset to a predetermined datum value indicative of a new tire, which is substantially zero in the present embodiment.

In some embodiments ECU1 may, in addition or instead, permit a user or authorized personnel to reset the tire life counter value tire_life_counter to the predetermined datum value, being substantially zero in the present embodiment as noted above, and input data indicative of values of parameters A to E that are appropriate to the tire that has been fitted. ECU1 may also permit data in respect of the maximum allowable tire life counter value tire_life_counter to be input. The data input may be in the form of a string of digits, for example in the form of a code, or any other suitable format.

In some embodiments, ECU1 calculates values of parameters A to E substantially continually when in power mode PM7 regardless of the CTIS operating mode in which the vehicle VH is operating. However, in the present embodiment, ECU1 only monitors values of parameters A to E, and increments the tire life counter value tire_life_counter at 1s intervals, if the CTIS1 is being operated in an off road mode 205 or puncture assist mode 221. Other arrangements may be useful.

Once the tire life counter value tire_life_counter reaches the maximum allowable value, ECU1 does not permit the vehicle VH to be operated in any of the off road modes 205.

In the present embodiment, if the vehicle VH is operating in an off road mode 205 when the maximum allowable value of tire life counter value tire_life_counter reaches the maximum allowable value, ECU1 causes HMI 37 to display a message to the driver indicating that further operation in the off road mode 205 should be terminated immediately due to exhaustion of off-road tire life. In the present embodiment ECU1 permits the vehicle to continue in a currently selected off road mode 205 for a further predetermined distance or time period such as 1 hour or 10 miles, or any other suitable values, before automatically causing the CTIS 1 to switch to the normal run mode 201NR. If a user switches to an on-road mode 201 or exits power mode PM7 before the predetermined distance or time elapses, then future operation in an off-road mode 205 is prevented by prohibiting selection of an off-road mode 205 until the tire life counter value tire_life_counter is reset.

In some embodiments one or more parameters other than parameters (a) to (e) may be employed to determine tire life expiry in addition or instead.

In the present embodiment ECU1 monitors tire life in respect of each tire individually. That is, ECU1 calculates a value of tire life counter value tire_life_counter in respect of each tire separately, and is capable of storing data in respect of the type of each tire on each wheel. Thus ECU1 performs a calculation of increment value increment value in respect of each tire separately.

In some embodiments, both the main and monitor ECUs ECU1, ECU2 are configured to calculate a value of tire life counter value tire_life_counter in respect of each tire separately. Thus if the main ECU ECU1 is caused to lose power by the ECU2, due to a fault, ECU2 may continue monitoring tire use and maintain a value of tire_life_counter. Other arrangements may be useful in some embodiments.

Tire Change Detection

In the present embodiment the CTIS 1 may be configured to detect when a wheel is removed from the vehicle VH in order to detect when a tire of the vehicle has been replaced. It is to be understood that, if ECU1 determines that a tire has been replaced, ECU1 may cause the HMI 37 to request a user to confirm whether or not a new tire has been fitted. If a user provides an indication that a new tire has been fitted, ECU1 may cause the tire life counter value tire_life_counter stored therein to be reset to the predetermined datum value indicative of a new tire, being substantially zero in the present embodiment as noted above. In some embodiments the user may be invited to input an indication of the extent to which a replacement tire has been used, for example a tire life counter value from a vehicle to which the tire was previously fitted.

In the present embodiment, when the HMI 37 displays a request for a user to indicate whether the tire has been changed, ECU1 may cause the HMI 37 to prompt a user to input data in respect of the tire that has been fitted, for example a serial number of the tire or other data indicative of the make and/or type of tire. Upon receipt of this data ECU1 may determine whether the tire is approved for operation with the CTIS 1. ECU1 may also determine the maximum allowable value of parameter tire_life_counter for the tire that has been fitted by reference to data stored therein. In some embodiments the user may be required to input data indicative of the maximum allowable value of parameter tire_life_counter before the tire is considered to be unsuitable for off-road operation.

In some embodiments ECU1 may prompt a user to perform an operation allowing ECU1 to verify that a tire has been fitted for which operation of the CTIS 1 in an off road mode 205 is approved. For example, the user may be prompted to run a computer software application ('app') on a computing device that is configured to transmit data to the CTIS 1 receipt of which by ECU1 enables ECU1 to determine whether a tire that has been fitted is approved for operation of the CTIS 1 in an off-road mode 205. Details of this process are described in more detail below.

In the present embodiment the vehicle VH is provided with wheel presence sensors in the form of wheel hub switches 100HS as illustrated in FIG. 4. Each wheel hub 100H of the vehicle VH, to which a wheel rim 100W bearing a tire T is attached, is provided with a push-to-make (PTM) wheel hub switch 100HS. The switch 100HS protrudes laterally outwards from a face of the wheel hub 100H against which the wheel rim 100W is pressed when the rim 100W is fitted to the vehicle VH. Fitting of a wheel rim 100W causes the switch to be depressed, causing the switch to assume an electrically closed condition. Removal of the wheel rim 100W causes the switch to assume an electrically open condition. ECU1 is configured to receive a signal indicative of the state of the wheel hub switch 100HS of each wheel hub 100H. In the event ECU1 determines that a wheel has been removed (due to opening of a wheel hub switch 100HS) and a wheel subsequently fitted (due to closing of the wheel hub switch 100HS), ECU1 causes the HMI 37 to request a user to indicate whether a new tire T has been fitted, as described above. It is to be understood that a wheel rim 100W may be removed from a vehicle VH for reasons other than tire replacement, such as for brake maintenance, and therefore ECU1 requests the user to indicate whether tire replacement has taken place and therefore whether ECU1 is required to prompt the user to input an indication of the type of tire that has been fitted.

It is to be understood that, in some embodiments, other types of sensor may be used to detect removal and refitting of a wheel. For example, in some embodiments a sensor may be employed that determines whether a wheel rim 100W is present or not based on one or more of electrical resistance, such as electrical resistance between a pair of electrodes, an amount of a capacitance sensed by a sensor that is dependent on the presence or absence of a wheel, optical detection, pressure sensing or any other suitable means. In some embodiments a wheel hub removal sensor may be arranged to monitor the amount of capacitance across two or more electrodes, the amount of capacitance depending on whether a wheel rim 100W is fitted to a wheel hub 100H. Other arrangements may be useful in some embodiments.

In some embodiments the CTIS 1 is configured to track, by means of ECU1, individual wheel rims 100W by tracking the tire pressure monitoring devices 100M attached to each wheel rim 100W as shown in FIG. 4. The tire pressure monitoring devices 100M form part of the TPMS 43 and are arranged to communicate wirelessly with TPMS controller 43C. Each wheel hub 100H is provided with an antenna for receiving the wireless signal transmitted by the pressure monitoring device 100M attached to the wheel rim 100W attached to that hub 100H. The TPMS controller 43C receives a signal from each antenna containing the signal transmitted by the associated pressure monitoring device 100M and is thereby able to determine the location of each wheel rim 100W individually. In some alternative embodiments a single antenna capable of determining the location of each wheel rim 100W by reference to the signals transmitted by the respective tire pressure monitoring device 100M may be provided. Other arrangements for determining the location of a given tire pressure monitoring device 100M may be useful.

In the present embodiment, as noted above, the TPMS 45 broadcasts on the CAN bus 45 a signal 56 that includes an indicator of the identity of the tire pressure sensor from which a pressure signal is obtained and the identity of the wheel to which it is attached (e.g. front left or front right), the measured pressure of the tire and the measured temperature of the tire.

In some embodiments, ECU1 stores in its memory 15M the identity of each tire pressure monitoring device 100M attached to a wheel rim 100W that is attached to a wheel hub 100H, the identity of the wheel hub 100H to which it is attached (e.g. front left of front right), and the most recent values of tire temperature and pressure measured by the device 100M. When the vehicle VH is parked and exits the driving power mode, power mode PM7, ECU1 stores the most recent values of temperature and pressure ECU1 for each pressure monitoring device 100M, along with the identity of the wheel hub 100H to which the corresponding wheel 100W is attached, in a further memory location.

When the vehicle resumes power mode PM7, i.e. is restarted, ECU1 checks again the identity of the pressure monitoring devices 100M associated with each wheel hub 100H by reference to signal 56 and checks whether the devices have been detected previously. In the present embodiment ECU1 stores the pressure monitoring device identifier for each of a predetermined number of most recently detected pressure monitoring devices 100m. In the present embodiment the predetermined number is 15 but other values may be useful.

In some embodiments, if ECU1 determines that a wheel has been removed from the vehicle, by reference to hub switch 100HS, and reattached to the same of a different wheel hub 100H to its last location, ECU1 checks the temperature and pressure of the tire T as indicated by the pressure monitoring device 100M in the wheel rim 100W to attempt to determine the likelihood that the tire T has been changed. ECU1 takes into account ambient temperature and the amount of time that has elapsed between respective pressure and temperature readings before power mode PM7 was last exited and after power mode PM7 was last assumed. If ECU1 determines that the temperature or pressure of the tire T as measured by the corresponding pressure monitoring device 100M is sufficiently different from the stored values received by ECU1 when power mode PM7 was last exited, ECU1 causes the HMI 37 to invite a user to indicate whether a tire has been changed. If the temperature and pressure are consistent with the same tire being present ECU1 does not cause the HMI 37 to invite the user to indicate whether a tire has been changed. If a tire has been changed and a user is not invited to indicate that a change has taken place, a user may manually inform ECU1, via HMI 37, that a tire change has taken place, if appropriate.

In some embodiments the CTIS 1 is unable to determine whether a wheel has been removed from a wheel hub 100H by reference to a wheel rim presence detector (which in the case of the present embodiment is in the form of wheel hub switch 100HS). Rather, ECU1 may either rely on a user informing ECU1 that a tire has been changed, or attempt to determine whether a wheel may have been removed and a tire replaced by reference to other data. In some embodiments, ECU1 may refer to the data in respect of location on the vehicle of each individual pressure measurement device 100M (by reference to the identifier transmitted by the devices 100M to the respective wheel hub 100H) and the temperature and pressure read out by the pressure measurement device 100M upon resumption of power mode PM7 relative to that when power mode PM7 was last exited, as described above.

If the location of a particular pressure measurement device 100M has changed, for example a wheel that was located at a front left of the vehicle when power mode PM7 was last exited is now located at a rear right of the vehicle VH, ECU1 causes the HMI 37 to invite a user to indicate whether a tire has been changed. Similarly, if the temperature and pressure values output by a given pressure measurement device 100M following resumption of power mode PM7 are not consistent with those read out when power mode PM7 was last exited, ECU1 causes the HMI 37 to invite a user to indicate whether a tire has been changed.

In some embodiments, the TPMS 43 may be configured to monitor tire pressure even when the vehicle VH is switched off, for example in power mode PM0. It is possible that a pressure monitoring device 100M remains within the range of radio reception by the vehicle VH of the signal transmitted by the device 100M (around 50 m in some embodiments) during the tire change. Accordingly the TPMS 43 may detect that the pressure in a tire falls substantially to atmosphere, indicative of a flat tire (and potentially of a tire change) during the tire change. If the TPMS 43 detects such a pressure change, the TPMS 43 may inform ECU1 which may in turn determine that a tire T has been changed and prompt a user to indicate whether a tire T has been changed.

In some embodiments, the pressure monitoring devices 100M may be configured to set a flag in a memory thereof when a pressure of the tire T falls below a predetermined value, indicative of a flat tire. Accordingly, regardless of whether the TPMS 43 remained in communication with a pressure monitoring device 100M during a period when the tire was changed, the TPMS 43 may be able to detect that the device 100M was exposed substantially to atmospheric pressure by reference to the flag. The TPMS 43 may communicate this information to ECU1, enabling ECU1 to determine that the tire T may have been changed, once the device 100M is again within radio range. The device 100M may be configured to reset the flag in response to a signal transmitted by the TPMS 43 indicative that the device 100M may reset the flag, once the TPMS 43 is in radio communication with the device 100M and has detected that the flag was set.

Intelligent Tires

In some embodiments each tire T (as opposed to each wheel rim 100VV) may be fitted with an intelligent tire monitoring device 100MT (as shown in dotted outline in FIG. 4). Each intelligent tire monitoring device 100MT may output a signal indicative of the identity of the monitoring device and one or more parameters associated with the tire T including tire pressure and temperature. In some embodiments the intelligent tire monitoring devices 100MT may be capable of outputting a signal indicative of tread depth and a static load on the tire. In some embodiments the intelligent tire monitoring device 100MT may be fitted to the tire in place of a monitoring device 100M being fitted to the wheel rim 100W although in some alternative embodiments the intelligent tire monitoring device 100MT may be fitted to the tire T and in addition a monitoring device 100M fitted to the wheel rim 100W.

In some embodiments, the intelligent tire monitoring device 100MT may be permanently attached to a tire. Since each device 100MT is configured to transmit a wireless signal having a substantially unique identity, ECU1 is able readily to detect that a new tire T has been fitted to a vehicle VH, based on the identity of the devices 100MT as transmitted on the vehicle CAN bus 45 by TPMS 43, by means of signal 56.

In the case of removable intelligent tire monitoring devices 100MT, when a device 100MT is fitted to a tire T, data in respect of the tire T to which the intelligent tire monitoring device 100MT is fitted may be communicated to the device 100MT at the time of installation by means of an external computing device such as a handheld wireless communications device such as a tablet or smartphone running a suitable computer software application. The device 100MT may also be configured to set a flag in the event the device 100MT is exposed to atmospheric pressure.

In some embodiments the intelligent tire monitoring device 100MT may be configured to reset the flag indicative that the device 100MT has been exposed to atmospheric pressure if the sensor has been rotated a predetermined number of times whilst at a pressure above a predetermined threshold value, in the presence of tire deformation. The device 100MT is thereby able to ensure that the tire T to which it is fitted has been rotated whilst fitted to a vehicle VH (resulting in deformation during rotation) and not to a tire balancing machine.

It is to be understood that if the device 100MT is removable, ECU1 may not be able to detect that a tire T has been changed by reference solely to the unique identifier transmitted by the device 100MT.

In some embodiments where an intelligent tire monitoring device 100MT is fitted to one or more tires T, ECU1 may be configured to attempt to detect abrupt changes in tire tread depth transmitted by a device 100MT to the TPMS 43 and broadcast on the CAN bus 45 by the TPMS 43 in the form of signal 56. It is to be understood that in some embodiments tread depth is inferred based on detection of tire flexure in use. The deeper the tread, the stiffer the driving face of the tire. Accordingly, it may be necessary for the tire T to which an intelligent tire monitoring device 100MT is fitted to rotate one or more times before the TPMS 43 is able to obtain a relatively reliable estimate of tread depth and enable ECU1 to detect a tire change. The intelligent tire monitoring device 100MT may be configured in some embodiments to require tire deformation to be seen before an estimate of tread depth is generated, in order to distinguish between rotation due to a tire balancing operation (in which the tire is not subject to load forces due to a driving surface) and rotation during driving. Alternatively, in some embodiments the device 100MT may be capable of estimating tread depth in the absence of tire loading. Accordingly rotating during wheel balancing may be sufficient to enable a reliable estimate of tread depth to be made. This may enable ECU1 to determine more rapidly that a given tire has been changed.

In the event ECU1 does detect a tire change ECU1 may cause the HMI 37 to request a user to confirm that a tire change has taken place and input information enabling the identity of the tire T to be determined. In some embodiments the tire monitoring device 100M, 100MT may itself transmit information sufficient to enable the type of tire T to be determined, and whether it is authorized for operation of the CTIS 1 in an off-road mode 205.

Tire Sidewall Scanning

It is to be understood that, in some embodiments, ECU1 may be configured only permit the CTIS 1 to assume an off-road mode 205 if ECU1 confirms that each tire fitted to the vehicle VH is a tire of a type that has been approved for operation of the CTIS 1. A list of tire types that have been approved for operation of the CTIS 1 may be stored in the memory 15M of ECU1. It is to be understood that in some arrangements it may be determined that any tire produced by a predetermined set of manufacturers and qualified by that manufacturer as an 'off road qualified tire' may be suitable for operation of the CTIS 1. The list of tire types that have been approved for operation of the CTIS 1 may be stored in the memory 15M of the ECU1 and the list updated when required e.g. as part of a software update release.

Accordingly, when a replacement tire is fitted to the vehicle, ECU1 may be configured to receive data in respect of the replacement tire and to determine, based on the data, whether the tire is a tire of a type that has been approved for operation of the CTIS 1.

In some embodiments the data may be data containing an indicator that indicates directly that the tire is approved, for example from an external computing device, via a wired or wireless interface, that is authenticated as qualified to determine whether a tire is approved or not approved and provide an indication to ECU1 whether the tire is approved or not approved. Alternatively the external computing device may convey data to ECU1 such as a tire type identifier sufficient to enable ECU1 to determine whether the tire is approved. In some embodiments ECU1 may permit a user to provide an indication directly through the HMI 37 whether a tire is approved for operation with CTIS 1.

If ECU1 is unable to determine that all tires fitted to the vehicle VH are approved for operation with the CTIS 1, ECU1 prevents operation of the vehicle in an off-road mode 205. Accordingly, when HMI 37 is caused to display a list of available CTIS operating modes, the off-road modes may be displayed in a color or shade indicating that they are not available.

In the present embodiment, ECU1 is configured to enable a user or service personnel to communicate to ECU1 data in respect of one or more tires fitted to the vehicle VH, in dependence on which ECU1 either permits or denies operation of the vehicle VH in an off-road mode 205. In the present embodiment the user or service personnel is required to use an imaging device to capture an image of a sidewall of a tire that has been fitted to the vehicle, or at least a portion of a datasheet associated with the tire, via a CTIS-qualified 'app', being a software application that is run by a computing device such as a smartphone or tablet device. The CTIS-qualified app is arranged to process an image of the sidewall or datasheet and to determine, from the image, whether the tire is approved for operation with the CTIS 1. The app may for example determine whether the image contains a predetermined one or more icons, indicia, letters, numerals or any other predetermined feature(s) and, based on the determination, provide an indication to ECU1 whether the tire is approved. The app may for example detect a barcode, 'QR' code or any other suitable code in a captured image and determine whether the tire is CTIS-approved based on the presence or absence of a suitable code.

In some embodiments the app may employ an optical character recognition technology to 'read' data in the image, for example a manufacturer's serial number for the tire, and determine based on the serial number, optionally by reference to a database, whether or not the tire is CTIS-approved. The computing device may be arranged to access the database online, or the database may be stored in a memory of the device. The computing device may be arranged to communicate an indication to the CTIS 1 via a wireless of wired link, whether a tire that has been fitted is CTIS-approved. ECU1 then determines, based on the received data, whether to permit operation in an off-road mode 205.

Other arrangements may be useful in some embodiments.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A controller for a motor vehicle central tire inflation system, the controller being configured to control the system to cause inflation and deflation of one or more tires, the controller being configured to cause the system to operate in a selected one of a plurality of operating modes in each of which the system is configured to set a pressure of one or more tires of the vehicle to a predetermined target tire pressure value, wherein the operating modes include a leakage assist mode in which the controller causes the system to inflate at least one tire to a predetermined leakage assist pressure value and to attempt to maintain the tire pressure at the predetermined leakage assist pressure value, the controller being configured automatically to cause the system to assume the leakage assist mode if it is determined that the at least one tire is suffering leakage, the controller being configured to determine that a tire is suffering leakage in dependence at least in part on a first pressure signal indicative of the pressure of the at least one tire, wherein the system comprises at least one pressure sensor remote from the tires for measuring pressure, wherein when the system determines that a tire is suffering leakage according to the first pressure signal the system is configured to establish a gas flow path between the tire and the remote pressure sensor and to measure a pressure of gas in the tire by means of the remote pressure sensor by reference to a second pressure signal indicative of a pressure measured by the remote pressure sensor, wherein if the pressure of gas in the tire according to the second pressure signal is sufficiently similar to the pressure of gas in the tire according to the first pressure signal the system is configured to determine that the tire is suffering leakage and to assume the leakage assist mode.

2. The controller according to claim 1 wherein the predetermined leakage assist pressure value is higher than the target value for the mode in which the vehicle operated prior to assuming the leakage assist mode.

3. A controller for a motor vehicle central tire inflation system, the controller being configured to control the system to cause inflation and deflation of one or more tires, the controller being configured to cause the system to operate in a selected one of a plurality of operating modes in each of which the system is configured to set a pressure of one or more tires of the vehicle to a predetermined target tire pressure value, wherein the operating modes include a leakage assist mode in which the controller causes the system to inflate at least one tire to a predetermined leakage assist pressure value and to attempt to maintain the tire pressure at the predetermined leakage assist pressure value, the controller being configured automatically to cause the system to assume the leakage assist mode if it is determined that the at least one tire is suffering leakage, the controller being configured to determine that the at least one tire is suffering leakage in dependence at least in part on a first pressure signal indicative of the pressure of the at least one tire, wherein the predetermined leakage assist pressure value is higher than the target value for the mode in which the vehicle operated prior to assuming the leakage assist mode.

4. The controller according to claim 3 wherein the system comprises at least one pressure sensor remote from the tires for measuring pressure, wherein when the system determines that a tire is suffering leakage according to the first pressure signal the system is configured to establish a gas flow path between the tire and the remote pressure sensor and to measure a pressure of gas in the tire by means of the remote pressure sensor by reference to a second pressure signal indicative of a pressure measured by the remote pressure sensor, wherein if the pressure of gas in the tire according to the second pressure signal is sufficiently similar to the pressure of gas in the tire according to the first pressure signal the system is configured to determine that the tire is suffering leakage and to assume the leakage assist mode.

5. The controller according to claim 1 configured automatically to cause the system to assume the leakage assist mode when each of a predetermined group of one or more conditions are met, the predetermined group including the condition that the tire pressure value has fallen below a predetermined tire pressure value.

6. The controller according to claim 5 wherein the predetermined tire pressure value is in the range from 0.1 bar to 0.5 bar.

7. The controller according to claim 5 wherein the predetermined group includes the condition that the tire pressure is decreasing at a rate exceeding a predetermined rate.

8. The controller according to claim 1 configured automatically to cause the system to assume the leakage assist mode when each of a predetermined group of one or more conditions are met, the predetermined group including the condition that the tire pressure is decreasing at a rate exceeding a predetermined rate.

9. The controller according to claim 7 wherein the predetermined rate is in the range from 0.2 mbar/hour to 0.4 bar/hour.

10. The controller according to claim 1 configured not to operate in the leakage assist mode if it is determined that more than one tire is suffering leakage.

11. The controller according to claim 1 wherein the controller is configured to cause the central tire inflation system to assume a safe state in which operation in which at least one system operating mode is prevented when one or more predetermined conditions are met, the controller being configured to cause the system to assume the leakage assist mode if it is determined that a tire is suffering leakage and the system has not assumed a safe state that prevents operation in the leakage assist mode.

12. The controller according to claim 1 configured to provide an alert to a user in the event a rate of leakage of gas from a tire is determined to exceed a predetermined value, the predetermined value being in the range from 0.2 bar/hour to 0.5 bar/hour.

13. The controller according to claim 1 wherein the first pressure signal indicative of the pressure of one or more tires is obtained by reference to at least one in-wheel tire pressure sensor of a wheel.

14. The controller according to claim 1 configured not to cause the system to assume the leakage assist mode if it is determined that more than one tire is suffering leakage.

15. A method of controlling a motor vehicle central tire inflation system implemented by means of a controller, the system being configured to cause inflation and deflation of one or more tires, the method comprising causing the system to operate in a selected one of a plurality of operating modes in each of which the system is configured to set a pressure of one or more tires of the vehicle to a predetermined target tire pressure value, wherein the operating modes include a leakage assist mode in which the controller causes the system to inflate the tires to predetermined leakage assist pressure value and to attempt to maintain the tire pressure at the predetermined leakage assist pressure value, the method comprising automatically causing the system to assume the leakage assist mode if it is determined that a tire is suffering leakage, the method comprising determining that a tire is suffering leakage in dependence at least in part on a first pressure signal indicative of the pressure of one or more tires, whereby if it is determined that the tire is suffering leakage according to the first pressure signal, the method comprises establishing a gas flow path between the tire and a remote pressure sensor and measuring a pressure of gas in the tire by means of the remote pressure sensor by reference to a second pressure signal indicative of a pressure measured by the remote pressure sensor, wherein if the pressure of gas in the tire according to the second pressure signal is sufficiently similar to the pressure of gas in the tire according to the first pressure signal the system is configured to determine that the tire is suffering leakage and to assume the leakage assist mode.

16. The method according to claim 15 whereby the predetermined leakage assist pressure value is higher than the target value for the mode in which the vehicle operated prior to assuming the leakage assist mode.

17. A method of controlling a motor vehicle central tire inflation system implemented by means of a controller, the system being configured to cause inflation and deflation of one or more tires, the method comprising causing the system to operate in a selected one of a plurality of operating modes in each of which the system is configured to set a pressure of one or more tires of the vehicle to a predetermined target tire pressure value, wherein the operating modes include a leakage assist mode in which the controller causes the system to inflate the tires to predetermined leakage assist pressure value and to attempt to maintain the tire pressure at the predetermined leakage assist pressure value, the method comprising automatically causing the system to assume the leakage assist mode if it is determined that a tire is suffering leakage, the method comprising determining that a tire is suffering leakage in dependence at least in part on a first pressure signal indicative of the pressure of one or more tires, whereby the predetermined leakage assist pressure value is higher than the target value for the mode in which the vehicle operated prior to assuming the leakage assist mode.

18. The method according to claim 17 whereby if it is determined that the tire is suffering leakage according to the first pressure signal, the method comprises establishing a gas flow path between the tire and a remote pressure sensor and measuring a pressure of gas in the tire by means of the remote pressure sensor by reference to a second pressure signal indicative of a pressure measured by the remote pressure sensor, wherein if the pressure of gas in the tire according to the second pressure signal is sufficiently similar to the pressure of gas in the tire according to the first pressure signal the system is configured to determine that the tire is suffering leakage and to assume the leakage assist mode.

* * * * *